US007156015B2

(12) United States Patent
McHale et al.

(10) Patent No.: US 7,156,015 B2
(45) Date of Patent: Jan. 2, 2007

(54) BALER

(75) Inventors: Padraic Christopher McHale, Mayo (IE); Martin William McHale, Mayo (IE); James John Heaney, Mayo (IE); Gerard Patrick Sheridan, Mayo (IE); Patrick Thomas O'Connor, Mayo (IE); John Patrick Biggins, Mayo (IE)

(73) Assignee: Welmount Limited, County Mayo (IE)

( * ) Notice: Subject to any disclaimer, the term of this patent is extended or adjusted under 35 U.S.C. 154(b) by 83 days.

(21) Appl. No.: 10/472,502

(22) PCT Filed: Mar. 22, 2002

(86) PCT No.: PCT/IE02/00036

§ 371 (c)(1),
(2), (4) Date: Apr. 24, 2004

(87) PCT Pub. No.: WO02/076184

PCT Pub. Date: Oct. 3, 2002

(65) Prior Publication Data
US 2004/0250702 A1   Dec. 16, 2004

(30) Foreign Application Priority Data
Mar. 22, 2001  (IE) ............................... S2001/0286
Jul. 19, 2001   (IE) ............................... S2001/0679

(51) Int. Cl.
*B30B 3/06*       (2006.01)
(52) U.S. Cl. ........................... 100/89; 100/177; 56/341
(58) Field of Classification Search ............ 100/5, 100/87, 88, 89, 177; 53/589; 56/341
See application file for complete search history.

(56) References Cited

U.S. PATENT DOCUMENTS

| 643,152 | A | * | 2/1900 | Parker ......................... 100/89 |
| 4,198,804 | A | | 4/1980 | Harig et al. |
| 4,566,379 | A | | 1/1986 | Decoence et al. |
| 4,685,270 | A | * | 8/1987 | Brambilla ..................... 53/176 |
| 4,730,446 | A | * | 3/1988 | van der Lely ................ 56/341 |
| 5,822,967 | A | * | 10/1998 | Hood et al. ................... 56/341 |

FOREIGN PATENT DOCUMENTS

| EP | 264 328 A | 4/1988 |
| GB | 2 152 873 A | 8/1985 |
| WO | WO 00 592 90 A | 10/2000 |

* cited by examiner

*Primary Examiner*—Lowell A. Larson
*Assistant Examiner*—Jimmy Nguyen
(74) *Attorney, Agent, or Firm*—Sughrue Mion, PLLC

(57) ABSTRACT

A combined baler/bale wrapper (1) comprises a chassis (5) on which a baler (10) and a bale wrapper (11) are mounted. The baler (10) comprises a stationary segment (18), a lower segment (19) and an upper segment (20) all of which carry bale forming rollers (25) which define a bale forming chamber (15) within which a round bale (2) is formed. The lower segment (19) and the upper segment (20) are pivotal about first and second pivot axes (35,40), respectively from a bale forming position (FIG. 5) to a discharge position (FIG. 1) for transferring a bale upwardly rearwardly from of the bale forming chamber (15) directly onto first and second bale supporting rollers (50) of the bale wrapper (11). The bale supporting rollers (50) rotate the bale (2) about a first wrapping axis (53) while a carrier ring (55) simultaneously revolves a pair of wrapping material dispensers (54) about a second horizontal wrapping axis (56) for dispensing wrapping material onto the bale (2) for wrapping thereof. The combined baler/bale wrapper is efficient, compact and of minimum length.

24 Claims, 18 Drawing Sheets

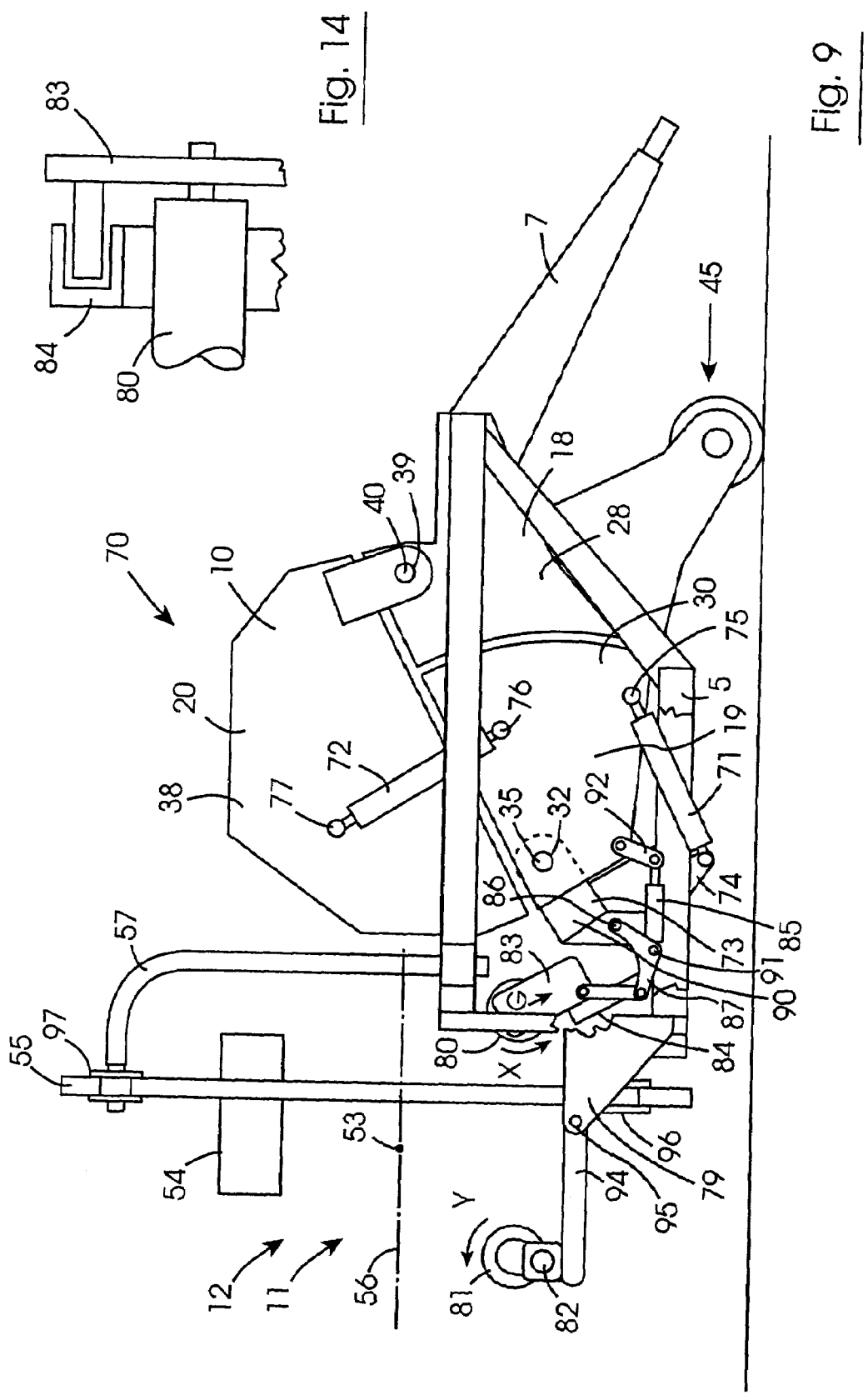

BALER

This is a National Stage Entry of Application No. PCT/IE02/00036 filed Mar. 22, 2002; the disclosure of which is incorporated herein by reference.

BACKGROUND OF THE INVENTION

The present invention relates to a fixed chamber baler and in particular, though not limited to a fixed chamber baler for baling material into a cylindrical bale, for example, fibrous animal fodder material, such as, for example, hay, straw, grass and the like.

Such fixed chamber balers are well known. Typically, the baler is mounted on a chassis which in turn is carried on ground engaging wheels. The chassis, typically, is arranged to be towed behind a towing vehicle, for example, a tractor. Power from the power take-off shaft of the tractor and from the hydraulic power supply is transmitted to the baler for operating the baler. Such fixed chamber balers define a bale forming chamber which, in general, is of fixed constant volume. Such fixed chamber balers are described in U.S. Pat. No. 4,176,596 of Welger, U.S. Pat. No. 4,651,512 of Texas Industries and U.S. Pat. No. 4,566,379 of Sperry. Other fixed chamber balers are disclosed in British Patent Specification No. 2,277,708A of Deere and European Patent Specification No. 0,788,732A of Welger.

In general, during the formation of the bale the volume of the bale forming chamber does not vary. Although, provision is made in the balers of U.S. Pat. No. 4,651,512 and U.S. Pat. No. 4,566,379 of Texas and Sperry, respectively for reducing the volume of the bale forming chamber initially at the commencement of the formation of each bale in order to form a compact core about which the bale is formed.

Such balers, in general, comprise a plurality of rotatably mounted rollers which are located around the circumferential periphery of the bale forming chamber, and which form the bale forming chamber. The rollers are rotated for rotating the material within the bale forming chamber around a main central axis defined by the bale forming chamber for forming the bale. Alternatively, slats carried on a pair of spaced apart chains extending around the circumferential periphery of the bale forming chamber define the bale forming chamber, and the slats are urged circumferentially around the bale forming chamber for rotating the material to be baled within the bale forming chamber around the main central axis of the bale forming chamber for forming the bale. In other such fixed chamber balers the slats which are carried on the spaced apart chains which extend around the circumferential periphery of the bale forming chamber may be replaced by belts, which cause the material to be baled in the bale forming chamber to rotate about the main central axis of the bale forming chamber. Such fixed chamber balers will be well known to those skilled in the art.

Such fixed chamber balers are extensively used for baling animal fodder, for example, hay, straw, silage and other fibrous animal fodder crops into cylindrical bales, which are commonly referred to as round bales. Such bales are typically of diameter of approximately 1.5 meters and of axial length of approximately 1.25 meters. In the baling of grass to form silage, after the bale has been formed it is then wrapped in a watertight, airtight wrapping material, typically, an adhesive coated plastics film material which is opaque to prevent light reaching the silage, and more commonly is of colour black, white or green. In general, such balers discharge the bale onto the ground, typically, in the field from which the grass has been harvested. A bale wrapper then picks up the formed bales and wraps the bales in the film material. This requires a bale wrapper to be trailed around the field after the baler to pick up the formed bales for wrapping. This is inefficient. Additionally, where hay, straw and the like are baled using such balers the formed bale is similarly discharged onto the ground in the field. Such bales, in general, do not require wrapping, and thus must be collected from the ground for storing in a barn or other suitable storing location. Due to the fact that such balers discharge a formed bale onto the ground, a further piece of apparatus is required to pick the bales up from the ground, either in the case of grass bales to wrap the grass bales, or in the case of hay and straw bales for transporting the hay and straw bales to the barn or other suitable storage location. This is inconvenient and inefficient.

It would be considerably more convenient if such fixed chamber balers were to deposit the bale onto a trailer, or in the case of silage, a bale wrapper, which could be trailed behind the baler, or indeed, could be formed by an extension of the chassis on which the baler is mounted. Fixed chamber balers are unsuitable for discharging a bale onto a trailer or onto a bale wrapper. This is because of the fact that such fixed chamber balers discharge the formed bale from the bale forming chamber from the lower end thereof. A lower portion of the baler which defines the bale forming chamber is pivoted downwardly from the baler to permit discharge of the formed bale downwardly rearwardly from the bale forming chamber. Because of the relatively low level at which the bale is discharged from the baler, in general, the bale must be discharged onto the ground, or alternatively, onto a transfer mechanism which is located at a low level just above the ground for raising the discharged bale from the low level at which it is discharged to an elevated position onto a trailer or a bale wrapper. This is unsatisfactory.

It is known to trail bale accumulators behind fixed chamber balers for collecting bales discharged from the baler, however, such accumulators must be provided with a platform for receiving the bales at a relatively low level. This requires that such bale accumulators must be low slung, and thus, are unsuitable for use over uneven ground. In general, since fields present an uneven surface, such low slung bale accumulators are unsuitable for use in the majority of fields.

Variable volume chamber balers are known which discharge a formed bale at a relatively high level. For example, European Patent Specification No. 0,309,938 of Hesston discloses such a variable volume chamber baler. However, such variable volume chamber balers lack the efficiency and versatility of fixed chamber balers, and furthermore, there is little control over the discharge of bales from such balers, which can thus lead to handling problems in the transfer of the bales to a trailer or bale wrapper located behind or trailed behind such balers.

There is therefore a need for a fixed chamber baler which is suitable for discharging a formed bale at a relatively high level, and in particular, at a level which is suitable for discharging the formed bale onto a trailer, a bale wrapper or other suitable storing platform which may be formed integral with or trailed behind the fixed chamber baler.

The present invention is directed towards providing such a fixed chamber baler.

SUMMARY OF THE INVENTION

According to the invention, there is provided a fixed chamber baler for forming a cylindrical bale of material, the baler defining a bale forming chamber within which the bale is formed, and a discharge means for discharging the bale from the baler, wherein the discharge means is operable to traverse into the bale forming chamber for urging the bale from the bale forming chamber.

In one embodiment of the invention, the discharge means traverses through the bale forming chamber for urging the bale from the bale forming chamber. Preferably, the discharge means traverses through the main central axis of the bale forming chamber for urging the bale from the bale forming chamber. Advantageously, the discharge means discharges the bale from the bale forming chamber in a generally upwardly outwardly direction therefrom.

In one embodiment of the invention, the discharge means discharges the bale from the bale forming chamber along a locus of discharge extending in a general direction between a vertical direction and a horizontal direction. Preferably, the locus of discharge along which the discharge means discharges the bale from the bale forming chamber extends in a generally radial direction. Advantageously, the locus of discharge along which the discharge means discharges the bale from the bale forming chamber is a generally arcuate locus.

In another embodiment of the invention, the discharge means comprises a portion of the baler, the said portion of the baler forming the discharge means being moveable relative to the baler for urging the bale from the bale forming chamber. Preferably, the moveable portion of the baler which forms the discharge means is moveable from a bale forming position co-operating with the baler for defining the bale forming chamber to a discharge position for discharging the bale from the bale forming chamber. Advantageously, the moveable portion of the baler which forms the discharge means is an integral part of the baler. Ideally, the moveable portion of the baler which forms the discharge means is a moveable lower portion of the baler.

In one embodiment of the invention, the moveable portion of the baler which forms the discharge means is pivotally mounted about a first pivot axis and is pivotal between the bale forming position and the discharge position about the first pivot axis for tipping the bale from the bale forming chamber.

In another embodiment of the invention, the bale forming chamber is substantially cylindrical defining an inner circumferential periphery and a main central geometrical axis. Preferably, the main central axis defined by the bale forming chamber extends substantially horizontally. Advantageously, the first pivot axis is parallel to the main central axis defined by the bale forming chamber.

In one embodiment of the invention, the moveable portion of the baler which forms the discharge means extends around the circumferential periphery of the bale forming chamber an angular distance in the range of 50° to 160°. Advantageously, the moveable portion of the baler which forms the discharge means extends around the circumferential periphery of the bale forming chamber an angular distance in the range of 60° to 115°. Preferably, the moveable portion of the baler which forms the discharge means extends around the circumferential periphery of the bale forming chamber an angular distance of approximately 110°.

In another embodiment of the invention, the first pivot axis is located within an arc extending not more than 30° above, and not more than 60° below a horizontal plane containing the main central axis of the bale forming chamber. Preferably, the first pivot axis is located within an arc extending downwardly from the horizontal plane containing the main central axis of the bale forming chamber not more than 60°. Advantageously, the first pivot axis is located within an arc extending downwardly from the horizontal plane containing the main central axis an angular distance from the said horizontal plane in the range of 30° to 40° of the bale forming chamber not more than 45°.

In another embodiment of the invention, the moveable portion of the baler which forms the discharge means comprises a lower arcuate segment which defines a part of the circumferential periphery of the bale forming chamber. Preferably, the moveable portion of the baler which forms the discharge means is moveable into the bale forming chamber from the bale forming position to the discharge position. Advantageously, the moveable portion of the baler which forms the discharge means is moveable through the bale forming chamber from the bale forming position to the discharge position. Ideally, the moveable portion of the baler which forms the discharge means is moveable through the main central axis of the bale forming chamber from the bale forming position to the discharge position.

In one embodiment of the invention, an upper portion of the baler is moveable from a bale forming position co-operating with the baler for forming the bale forming chamber to a discharge position defining with the baler an open mouth to the bale forming chamber for facilitating discharge of the bale from the bale forming chamber. Preferably, the moveable upper portion of the baler which is moveable from the bale forming position to the discharge position extends around the circumferential periphery of the bale forming chamber through an angular distance of up to 180°. Advantageously, the moveable upper portion of the baler is moveable in a generally upwardly direction from the bale forming position to the discharge position.

In one embodiment of the invention, the moveable upper portion of the baler is pivotally mounted about a second pivot axis and is pivotal about the second pivot axis between the bale forming position and the discharge position.

Preferably, the first and second pivot axes are parallel to each other. Preferably, the respective first and second pivot axes are located adjacent the circumferential periphery of the bale forming chamber.

In one embodiment of the invention, the respective first and second pivot axes are spaced apart from each other an angular distance of at least 180° around the main central geometrical axis of the bale forming chamber.

In another embodiment of the invention, the second pivot axis is located within an arc extending not more than 60° above, and not more than 30° below the horizontal plane containing the main central axis of the bale forming chamber. Preferably, the second pivot axis is located within an arc extending not more than 30° above the horizontal plane containing the main central axis of the bale forming chamber and not more than 15° below the horizontal plane containing the main central axis of the bale forming chamber. Advantageously, the second pivot axis is located within an arc extending above the horizontal plane containing the main central axis of the bale forming chamber an angular distance from the said horizontal plane in the range of 10° to 15°.

In another embodiment of the invention, the upper portion of the baler comprises an upper arcuate segment which defines a part of the circumferential periphery of the bale forming chamber.

In another embodiment of the invention, the moveable upper and lower portions of the baler are sequentially operable between the bale forming position and the discharge position, whereby movement of the moveable upper portion from the bale forming position to the discharge position commences prior to movement of the moveable lower portion from the bale forming position to the discharge position.

In a further embodiment of the invention, movement of the moveable lower portion of the baler from the discharge position to the bale forming position commences prior to movement of the moveable upper portion of the baler from the discharge position to the bale forming position.

In one embodiment of the invention, the respective moveable upper and lower portions of the baler terminate relatively closely to each other adjacent the first pivot axis. Preferably, the respective moveable upper and lower portions of the baler substantially abut each other adjacent the first pivot axis.

In another embodiment of the invention, a first urging means is provided for urging the moveable lower portion of the baler between the bale forming position and the discharge position. Preferably, the first urging means acts between the moveable lower portion of the baler and the baler. Advantageously, the first urging means comprises a first ram.

In another embodiment of the invention, a second urging means is provided for urging the moveable upper portion of the baler between the bale forming position and the discharge position. Preferably, the second urging means acts between the moveable upper portion and the moveable lower portion of the baler. Advantageously, the second urging means comprises a second ram.

In a further embodiment of the invention, the baler comprises a stationary arcuate segment for defining a part of the bale forming chamber, the stationary arcuate segment extending along the circumferential periphery between the respective upper and lower portions of the bale forming chamber. Preferably, the stationary arcuate segment extends circumferentially from the second pivot axis.

In another embodiment of the invention, the baler comprises a bale forming means for forming the material into a bale. Preferably, the bale forming means comprises a plurality of bale forming rollers rotatably carried in the baler and arranged around the main central axis to define the circumferential periphery of the bale forming chamber. Advantageously, the bale forming rollers define respective secondary geometrical axes which extend parallel to the main central axis defined by the bale forming chamber. Preferably, a drive transmission means is provided for rotating the bale forming rollers for forming the bale in the bale forming chamber.

In one embodiment of the invention, each of the upper and lower moveable portions of the baler carry corresponding ones of the bale forming rollers. In another embodiment of the invention, the stationary arcuate segment carries corresponding ones of the bale forming rollers.

In one embodiment of the invention, an inlet is provided to the bale forming chamber through which material to be baled is fed into the bale forming chamber, the inlet being located at a level such that the bale is discharged from the bale forming chamber by the discharge means at a level above the level of the inlet. Preferably, the inlet to the bale forming chamber defines a lower edge, and the inlet is located relative to the first pivot axis such that the lower edge of the inlet is at a level below a horizontal plane containing the first pivot axis. Advantageously, the inlet to the bale forming chamber is located at a level which is completely below the horizontal plane containing the first pivot axis.

In one embodiment of the invention, the baler comprises a chassis, the chassis defining a main central longitudinal axis extending along the chassis in the general direction of forward motion of the chassis, and the inlet to the bale forming chamber is located towards the front of the baler relative to the direction of forward motion of the chassis. Preferably, the discharge means discharges the bale from the bale forming chamber in a generally rearwardly direction. Preferably, the main central axis defined by the bale forming chamber extends transversely of the main central longitudinal axis. Advantageously, the main central longitudinal axis extends substantially horizontally.

Additionally, the invention provides a fixed chamber baler for forming a cylindrical bale of material, the baler defining a bale forming chamber within which the bale is formed, and a discharge means for discharging the bale from the baler, wherein the discharge means discharges the bale in a generally upwardly outwardly direction from the bale forming chamber.

In one embodiment of the invention, the discharge means discharges the bale from the bale forming chamber along a locus of discharge extending in a general direction between a vertical direction and a horizontal direction.

Additionally, the invention provides a fixed chamber baler for forming a cylindrical bale of material, the baler defining a bale forming chamber within which the bale is formed, and a discharge means for discharging the bale from the baler, wherein the discharge means discharges the bale from the bale forming chamber along a locus of discharge extending in a general direction between a vertical direction and a horizontal direction.

Preferably, the locus of discharge along which the discharge means discharges the bale from the bale forming chamber extends in a generally radial direction. Advantageously, the locus of discharge along which the discharge means discharges the bale from the bale forming chamber is a generally arcuate locus.

In one embodiment of the invention, the discharge means comprises a portion of the baler, the said portion of the baler forming the discharge means being moveable relative to the baler for urging the bale from the bale forming chamber.

The advantages of the invention are many. A particularly important advantage of the invention is that it permits the bale to be discharged from the baler at a relatively high level. This has the advantage that the bale can be discharged onto other apparatus without the need for further transfer mechanisms. For example, in many cases it is desirable to discharge formed bales onto a bale accumulator, which may be a trailed unit which is trailed behind the baler and collects a predetermined number of bales, for example, two, three or more, and when the predetermined number of bales have been collected the bales are simultaneously discharged so that instead of having a large number of bales randomly dropped off at spaced apart locations by the baler, clusters of bales are discharged at each location. This significantly facilitates collection of the bales from a field, and where the bales are to be wrapped, the bales can be wrapped where they have been discharged, and the cluster of wrapped bales can then be subsequently collected.

Alternatively, where it is desired to transfer the formed bales to a barn or other storage area prior to being wrapped, or in cases where the bales are not to be wrapped, a trailer may be trailed behind the baler according to the invention, and since the bales are discharged at a relatively high level, the bales can be discharged directly onto the trailer. When an appropriate number of bales have been discharged onto the trailer, the trailer can be unhitched, and an empty trailer hitched to the bailer. By virtue of the fact that the bales are discharged in a generally upwardly outwardly direction from the bale forming chamber, the bales are discharged from the bale forming chamber at a relatively significant height above the ground, which is suitable for facilitating direct discharge of the bales from the bale forming chamber onto an accumulator, trailer, or indeed, directly onto a bale wrapper.

A particularly important advantage of the invention is achieved when the bale is discharged from the bale forming chamber in a generally upwardly direction which is between a generally vertical direction and a generally horizontal direction. This provides that the bale is discharged from the bale forming chamber at a relatively high level. A further advantage is achieved when the bale is discharged radially outwardly of the bale forming chamber along an arcuate discharge locus, in that this facilitates a particularly advantageous construction of baler.

Traversing the discharge means into the bale forming chamber for discharging the bale in particular facilitates the general upwardly outwardly discharge of the bale from the bale forming chamber, and by traversing the discharge means through the baler for discharging the bale from the bale forming chamber facilitates discharge of the bale along the arcuate locus of discharge which is in a generally upwardly direction between a generally vertical direction and a generally horizontal direction. This is further achieved by traversing the discharge means through the main central axis defined by the bale forming chamber.

By having the upper portion of the bale forming chamber moveable in a generally upwardly direction for forming an open mouth through which the bale is discharged from the bale forming chamber, a particularly advantageous construction of baler is provided, and pivoting the upper portion of the bale forming chamber in a generally upwardly direction further facilitates in the discharge of the bale along the arcuate locus of discharge in the generally upwardly direction between the generally vertical and generally horizontal directions. Indeed, by virtue of the fact that the upper portion of the baler is pivoted in a generally upwardly direction away from the area from which the bale is being discharged there is no need for additional mechanisms for pushing the discharged bale when discharged onto the ground or other platform away from the baler for facilitating return of the upper portion of the bale forming chamber to the bale forming position after the bale has been discharged. This has been a particular problem in balers known heretofore, where a rearward portion of the bale forming chamber is pivotal rearwardly upwardly about an upper pivot axis for facilitating discharge of the bale from the bale forming chamber. In such cases, the rearward portion of the bale forming chamber cannot be closed until the bale has been pushed well away rearwardly from the baler. This, in general, requires an additional mechanism commonly referred to as a bale kicker for pushing the bale rearwardly of the baler for facilitating closure of the pivotal rear portion of the bale forming chamber.

A further advantage of the baler according to the invention is that the bale is positively discharged from the bale forming chamber by virtue of the fact that the discharge means traverses into the bale forming chamber for discharge of the bale. Thus, there is no danger of a bale remaining stuck or jammed in the baler as can happen in balers known heretofore where the bale is discharged downwardly out of the bale forming chamber under gravity.

In certain embodiments of the invention the discharge means for discharging the bale from the bale forming chamber may be provided by an independent discharge means which may be located externally of the baler and which would traverse into the bale forming chamber for urging the bale upwardly outwardly therefrom. Preferably, the discharge means in all cases would traverse into the bale forming chamber for urging the bale from the bale forming chamber, and in particular, for urging the bale upwardly along an arcuate discharge locus between a generally vertical direction and a generally horizontal direction, and ideally, the discharge means would traverse through the bale forming chamber for urging the bale upwardly outwardly of the bale forming chamber.

BRIEF DESCRIPTION OF THE DRAWINGS

The invention will be more clearly understood from the following description of some preferred embodiments thereof which are given by way of example only with reference to the accompanying drawings in which:

FIG. 9 is a schematic side elevational view of a combined baler/bale wrapper comprising a baler according to another embodiment of the invention, FIG. 14 is a plan view of a detail of the baler/bale wrapper of FIG. 9.

DETAILED DESCRIPTION OF THE INVENTION

Figure 1:
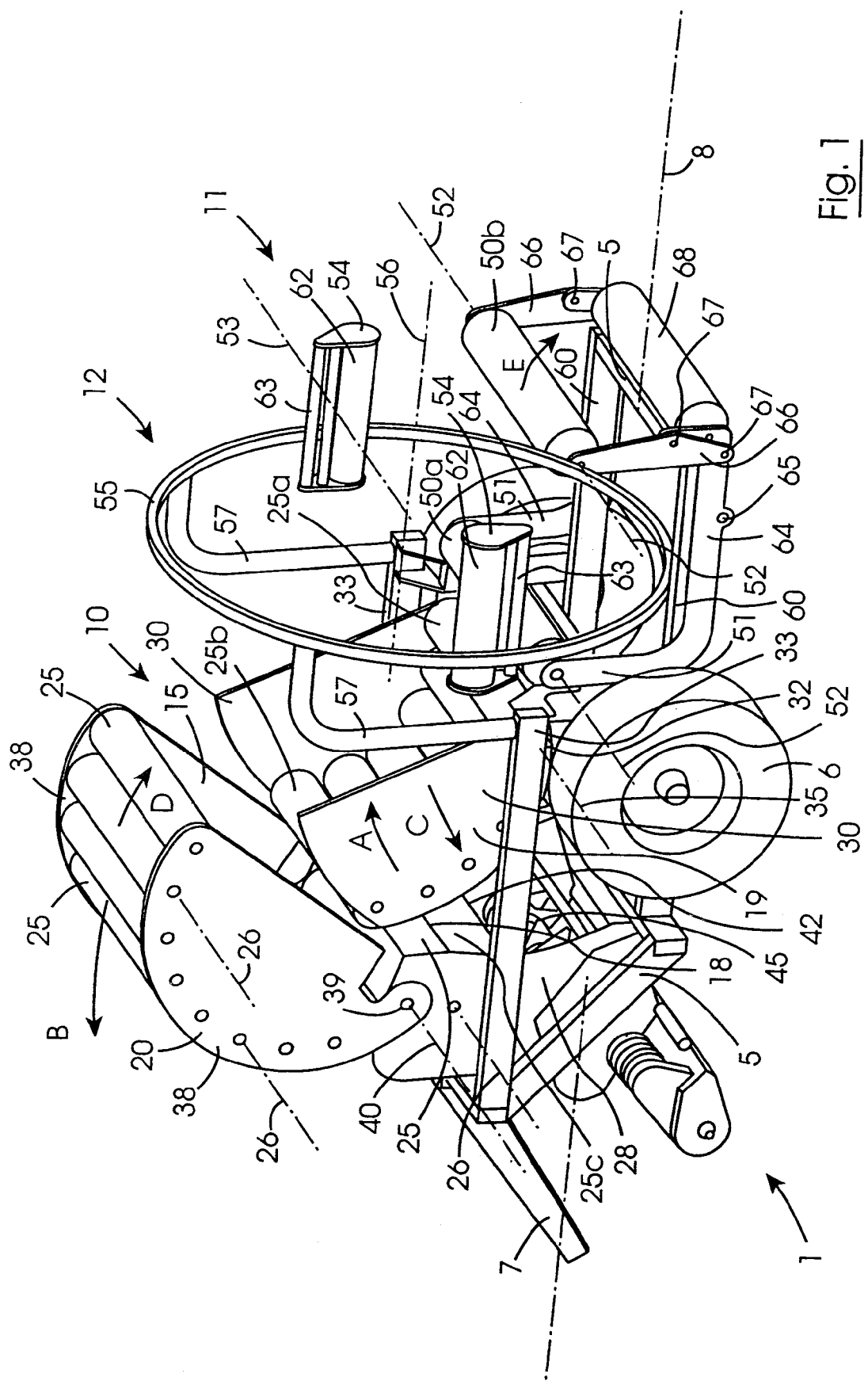
FIG. 1 is a perspective view of a combined baler/bale wrapper comprising a baler according to the invention.
Figure 2:
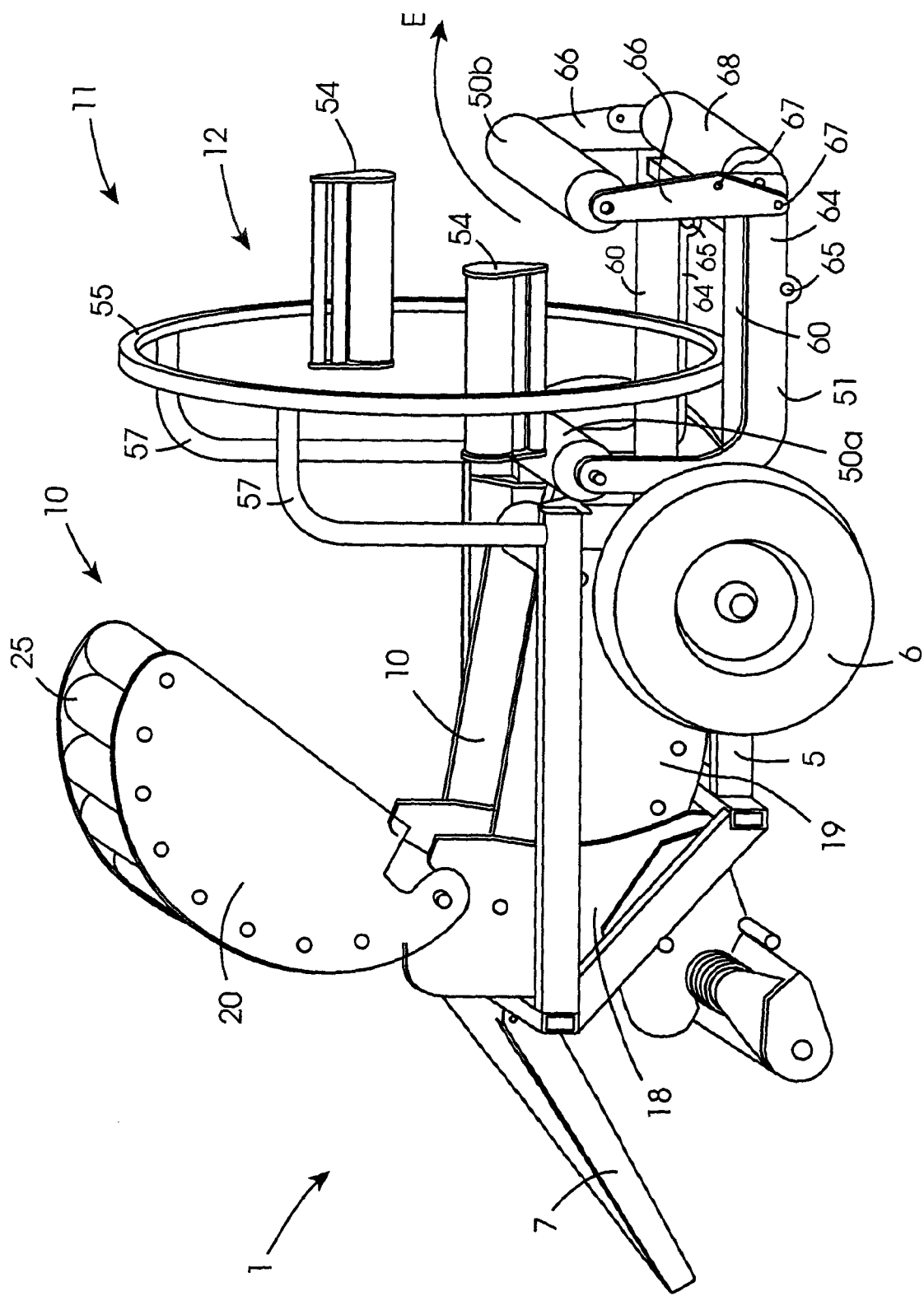
FIG. 2 is a side perspective view of the baler/bale wrapper of FIG. 1.
Figure 3:
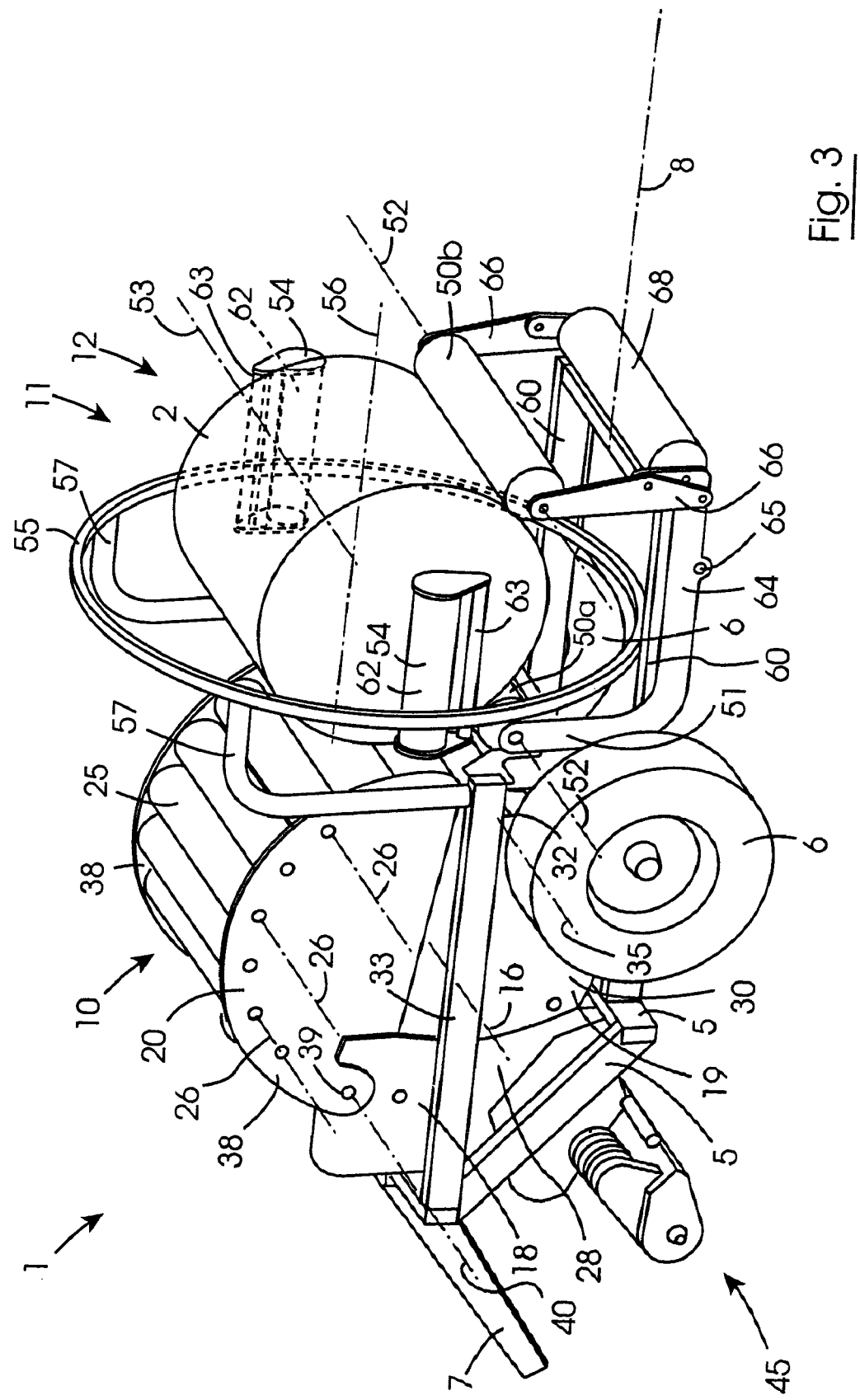
FIG. 3 is a perspective view of the baler/bale wrapper of FIG. 1 in use.
Figure 4:
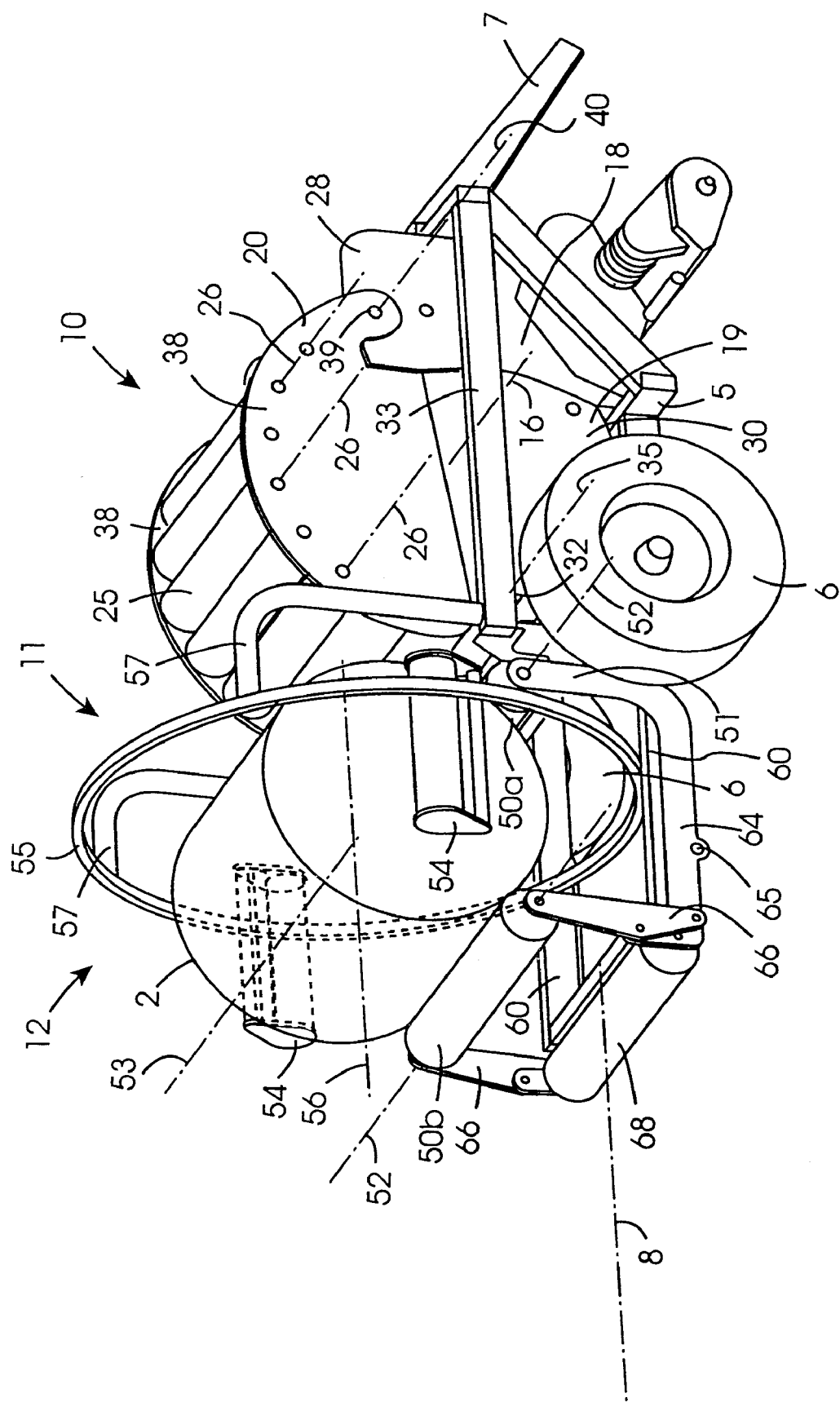
FIG. 4 is another perspective view of the baler/bale wrapper of FIG. 1 also in use from the other side to that illustrated in FIGS. 1 to 3.
Figure 5:
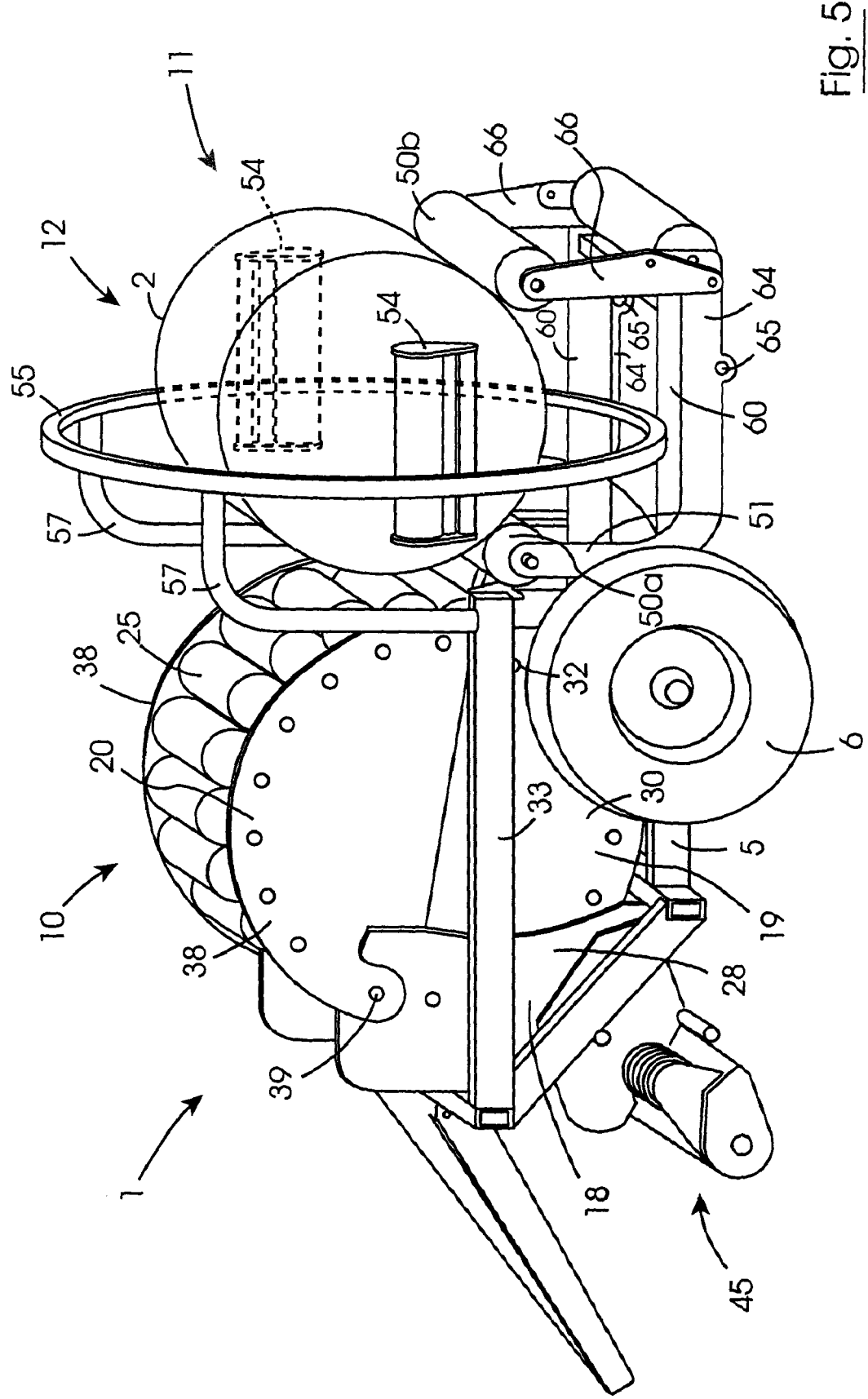
FIG. 5 is another side perspective view of the bale/bale wrapper of in use.

Referring to the drawings and initially to FIGS. 1 to 8 thereof there is illustrated a combined baler/bale wrapper indicated generally by the reference numeral 1 for forming and wrapping a cylindrical bale of fodder material, typically, silage, the bale being of the type typically referred to as a round bale. In this embodiment of the invention the bale formed is of diameter approximately 1.25 meters and axial length of approximately 1.25 meters. A bale 2 is illustrated diagrammatically in FIGS. 3 to 6 being wrapped as will be described below. The baler/bale wrapper 1 is particularly suitable for towing behind a towing vehicle, such as, for example, a tractor, and is powered by the tractor, although the baler/bale wrapper could be self propelled and self powered. The baler/bale wrapper 1 comprises a chassis 5 which is carried on a pair of rotatably mounted ground engaging wheels 6. A framework 7 extending forwardly from the chassis 5 terminates in a hitch (not shown) for hitching the baler/bale wrapper 1 to a tractor (not shown). The chassis 5 defines a main central longitudinal axis 8 which extends centrally, horizontally and longitudinally in the general direction of forward motion of the chassis 5.

A baler according to the invention indicated generally by the reference numeral 10 for sequentially forming round bales 2 of silage therein is mounted on the chassis 5 to the forward end thereof. A bale wrapping means, namely, a bale wrapper indicated generally by the reference numeral 11 for wrapping each bale formed by the baler 10 is located in a bale wrapping area 12 on the chassis 5 rearwardly of and adjacent the baler 10, and in line therewith so that bales 2 formed in the baler 10 can be readily transferred directly from the baler 10 to the bale wrapper 11 as will be described below.

The baler 10 is a fixed chamber baler, and defines a cylindrical bale forming chamber 15 within which the bales 2 are sequentially formed. The bale forming chamber 15 defines a main central geometrical axis 16, and the baler 10 is located on the chassis 5 with the main central axis 16 extending horizontally and transversely of the main central longitudinal axis 8 when viewed in plan. The baler 10 is formed in three portions, namely, a stationary arcuate segment 18, a moveable lower portion provided by a lower arcuate segment 19 and a moveable upper portion provided by an upper arcuate segment 20, the three of which co-operate together in a bale forming position to define the bale forming chamber 15, see FIGS. 3 to 6. The respective arcuate segments 18, 19 and 20 each carry bale forming means, namely, a plurality of bale forming rollers 25 for rotating the material about the main central axis 16 for forming the bale in the bale forming chamber 15. The bale forming rollers 25 define the inner circumferential periphery of the bale forming chamber, and define respective secondary axes 26 which extend parallel to the main central axis 16. The bale forming rollers 25 are rotatable about their corresponding secondary axes 26 for rotating the material in the bale forming chamber 15 for forming the bale. A drive transmission (not shown) is provided for transmitting drive from a power take-off shaft of the tractor to the bale forming rollers 25 for rotating the bale forming rollers 25.

A pair of spaced apart side walls 28 extend upwardly from the chassis 5 for forming the stationary segment 18. Three of the bale forming rollers 25 extend between and are rotatably carried on the side walls 28 in bearings (not shown). The lower segment 19 comprises a pair of spaced apart lower side walls 30 which rotatably carry six of the bale forming rollers 25 in bearings (not shown). The lower segment 19 forms a discharge means and is pivotally carried on a first pivot shaft 32 which in turn is carried on respective side members 33 of the chassis 5 for discharging the bale 2 from the bale forming chamber 15. The first pivot shaft 32 defines a first pivot axis 35, and the lower segment 19 is pivotal about the first pivot axis 35 through a generally upwardly extending arc in the direction of the arrow A from the bale forming position to a discharge position for discharging a formed bale 2 generally upwardly, rearwardly from the bale forming chamber 15 directly to the bale forming area 12 onto the bale wrapper 11. In other words, the bale is discharged from the bale forming chamber 15 through a locus of discharge in an arc, in a general upward direction which is between a general vertical direction and a general horizontal direction. The first pivot axis 35 extends parallel to the main central axis 16. The lower side walls 30 are pivotally carried on the first pivot shaft 32, and the first pivot shaft 32 rotatably carries one of the bale forming rollers 25 of the lower segment 19, namely, the bale forming roller 25a.

The upper segment 20 comprises a pair of upper side walls 38 between which eight of the bale forming rollers 25 are rotatably carried in bearings (not shown). The upper segment 20 is pivotally carried on a second pivot shaft 39 which extends between and is carried on the side walls 28 of the stationary segment 18, and which defines a second pivot axis 40 extending parallel to the main central axis 16. The upper segment 20 is pivotal in a generally upwardly forwardly direction from the bale forming position in the direction of the arrow B to a discharge position illustrated in FIGS. 1 and 2 whereby the upper arcuate segment 20 defines an open mouth with the lower segment 19 for facilitating transfer of a formed bale from the bale forming chamber 15 to the bale wrapper 11.

Accordingly, when the lower segment 19 and the upper segment 20 are in the bale forming position defining with the stationary segment 18 the bale forming chamber 15, the respective stationary, lower and upper segments 18, 19 and 20 define the bale forming chamber 15 which is of fixed constant size.

Figure 6:
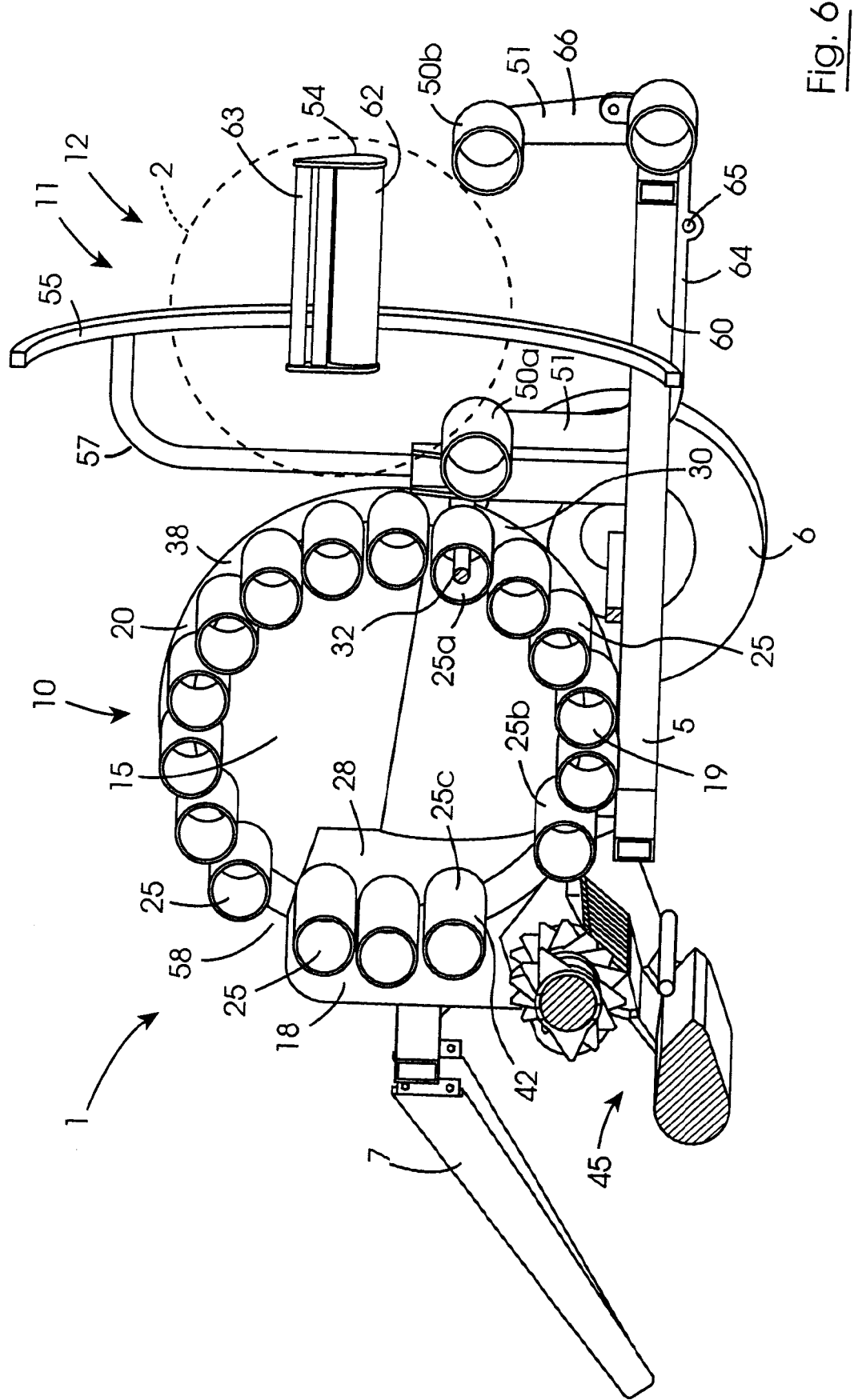
FIG. 6 is a partly cut away cross-sectional perspective view of the baler/bale wrapper of FIG. 1.
Figure 7:
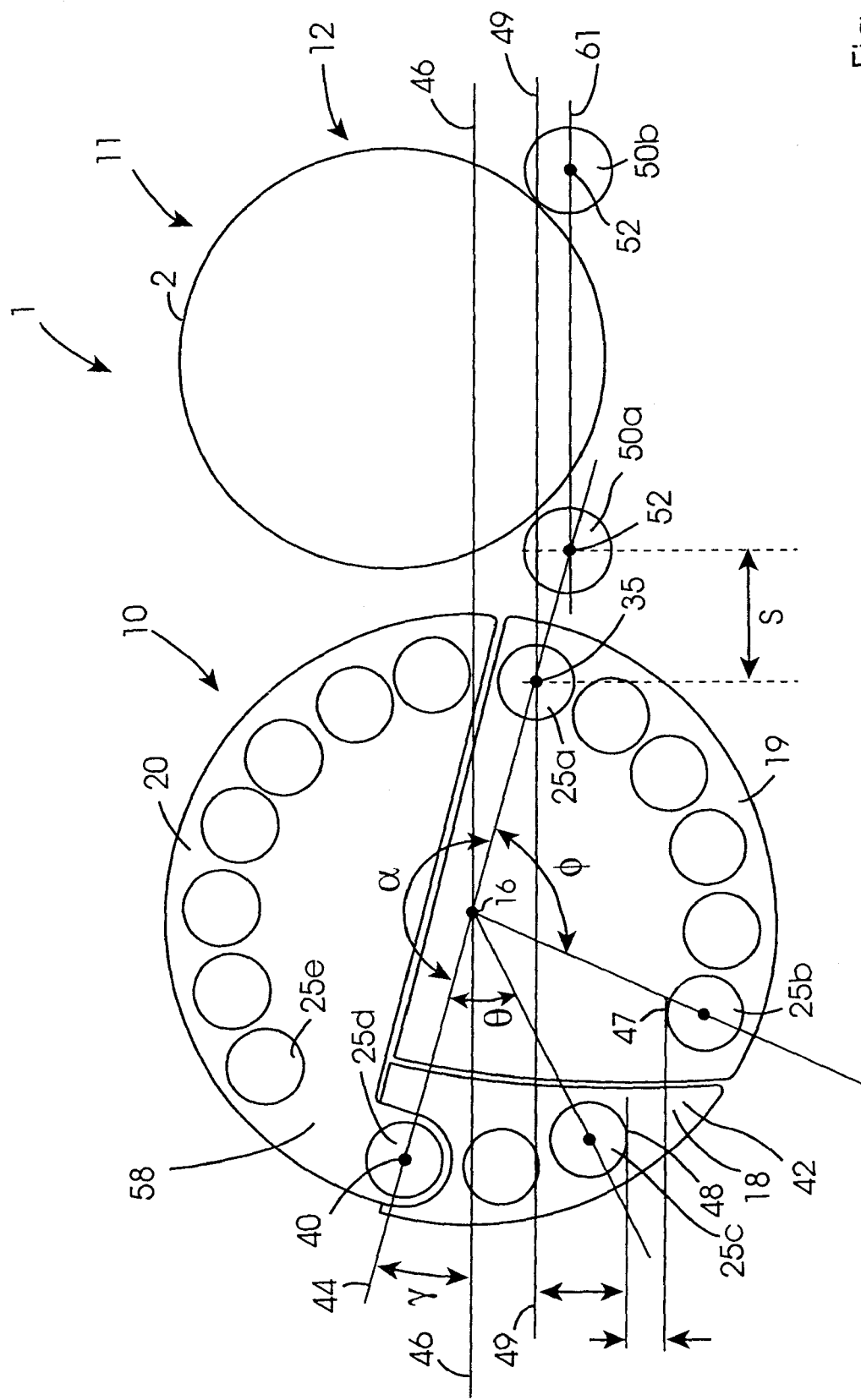
FIG. 7 is a partly diagrammatic side elevational view of the baler/bale wrapper of FIG. 1, FIGS. 8a to 8d are diagrammatic side elevational views of the baler/bale wrapper of FIG. 1, in use.

The bale forming rollers 25 of the upper segment 20 extend through an angle α of approximately 180° around the circumferential periphery of the bale forming chamber 15, while the bale forming rollers 25 of the stationary segment 18 extend through an angle θ of approximately 25° around the circumferential periphery of the bale forming chamber 15, see FIG. 7. The bale forming rollers 25 of the lower arcuate segment 19 extend through an angle φ of approximately 30° around the circumferential periphery of the bale forming chamber 15, see FIG. 7. When the lower segment 19 is in the bale forming position one of the bale forming rollers 25b of the lower segment 19 defines with one of the bale forming rollers 25c of the stationary segment 18 an inlet opening 42 to the bale forming chamber 15 through which the fodder material to be baled is fed into the bale forming chamber 15 as will be described below, see in particular FIGS. 6 and 7. The side walls 28 of the stationary segment 18, the lower side walls 30 of the lower segment 19 and the upper side walls 38 of the upper segment 20 form opposite end walls of the bale forming chamber 15 when the lower and upper segments 19 and 20 are in the bale forming position, for retaining the bale in the bale forming chamber 15 during formation thereof.

The first and second pivot shafts 32 and 39 are located adjacent the circumferential periphery of the bale forming chamber, with their respective pivot axes 35 and 40 spaced apart from each other approximately 180° around the main central axis 16. The respective first and second pivot axes 35 and 40 of the first and second pivot shafts 32 and 39, respectively, lie in a common plane 44 with the main central axis 16 which is disposed at an angle γ of approximately 15° to a horizontal plane 46 containing the main central axis 16, see FIG. 7. Accordingly, the first pivot axis 35 is disposed below the horizontal plane 46 about the main central axis 16 an angular distance of approximately 15°, and the second pivot axis 40 is disposed above the horizontal plane 46 about the main central axis 16 an angular distance of approximately 15°, see FIG. 7. In other words, the first and second pivot shafts 32 and 39 are located at substantially diametrically opposite sides of the bale forming chamber 15. Accordingly, by virtue of the fact that the second pivot axis 40 is disposed an angular distance of only 15° above the horizontal plane 46 containing the main central axis 16, the upper segment 18 when pivoting between the bale forming position and the discharge position pivots in a generally upwardly forwardly direction, thus causing minimum interference with the bale wrapper 11 when pivoting between the bale forming and discharge positions. Additionally, by virtue of the fact that the first pivot axis 35 is disposed an angular distance of approximately 15° below the horizontal plane 46 containing the main central axis 16, the lower segment 19 is pivoted in a generally upwardly direction from the bale forming position to the discharge position for thus urging the bale through a generally upwardly rearwardly directed arc from the bale forming chamber 15.

A first urging means provided by a pair of first hydraulic rams 41 on opposite sides of the chassis 5, see FIG. 8, act between the chassis 5 and the lower segment 19 for pivoting the lower segment 19 in the directions of the arrows A and C between the bale forming position and the discharge position. A second urging means provided by a pair of second hydraulic rams 43 on respective opposite sides of the baler 10, acting between the lower segment 19 and the upper segment 20, pivot the upper segment 20 about the second pivot shaft 39 in the direction of the arrows B and D between the bale forming and discharge positions, see FIG. 8. The first and second rams 41 and 43 are powered through hydraulic circuitry and hydraulic control circuitry (not shown) by the hydraulics power supply of the tractor or by an on-board hydraulic power supply. Such hydraulic circuitry will be well known to those skilled in the art.

A pick-up rake mechanism 45 (see FIG. 6) is provided forwardly of the inlet opening 42 beneath the chassis 5 for picking up fodder from the ground, and delivering the fodder through the inlet opening 42 into the bale forming chamber 15, such pick-up mechanisms will be well known to those skilled in the art. The bale forming rollers 25b and 25c which define the inlet opening 42 define respective lower and upper edges 47 and 48, respectively, of the inlet opening 42. Both the lower and upper edges 47 and 48 of the inlet opening 42 are located at respective levels which are below the level of a horizontal plane 49 which contains the first pivot axis 35, see FIG. 7. Accordingly, in this embodiment of the invention the entire inlet opening 42 is at a level below the first pivot axis, and thus is below the level at which the bale is discharged from the bale forming chamber 15 which is at a level above the first pivot shaft 32. This, thus, facilitates the baler 10 being located on the chassis 5 at a level suitable for picking up fodder from the ground, while at the same time discharging the bale 2 from the bale forming chamber 15 at a level which permits direct transfer by the lower segment 19 from the bale forming chamber 15 onto the bale wrapper 11 at a level which is suitable for wrapping the bale 2, without the need for further elevating mechanisms for elevating the bale onto the bale wrapper 11.

A gap 58, see FIGS. 6 and 7, is provided between one of the bale forming rollers 25d of the stationary segment 18, and one of the bale forming rollers 25e in the upper segment 20 for accommodating netting (not shown) from a roll (also not shown) mounted on the upper segment 20 for wrapping around the circumference of a formed bale in the bale forming chamber 15 prior to the formed bale being transferred from the baler 10 for retaining the material of the formed bale together prior to it being wrapped with film material by the bale wrapper 11. The provision and use of such netting material in the formation of a round bale will be well known to those skilled in the art. Instead of netting, twine or plastics material film may be fed through the gap 58 between the bale forming rollers 25d and 25e for tying or wrapping around the circumference of the formed bale in the bale forming chamber 15, for retaining the material of the bale together until it has been wrapped by the bale wrapper 11.

The bale wrapper 11 is a two axes bale wrapper, and comprises a bale support means in this embodiment of the invention provided by a pair of spaced apart first and second bale supporting rollers 50a and 50b, respectively, which support and rotate the bale 2 during wrapping. The first and second bale supporting rollers 50 are rotatably carried on a support framework 51, which is pivotally carried on the chassis 5, as will be described below. The bale supporting rollers 50 define central geometrical axes 52, which extend horizontally and parallel to each other and parallel to the main central axis 16 of the bale forming chamber 15. The bale supporting rollers 50 receive a formed bale directly from the baler 10 with the central axis of the bale parallel to the axes 52 of the bale supporting rollers 50. A first drive means provided by a first drive motor (not shown) is provided for driving one or both of the bale supporting rollers 50 about their respective geometrical axes 52 for rotating the bale 2 about a horizontal first wrapping axis 53 which coincides with the central geometric axis of the bale during wrapping of the bale 2. The first wrapping axis 53 extends parallel to the main central axis 16 defined by the bale forming chamber 15 and transversely of the main central longitudinal axis 8 defined by the chassis 5.

A wrapping material dispensing means for dispensing sheet wrapping material for wrapping the bale 2 on the bale supporting rollers 50 comprises a pair of wrapping material dispensers 54 which are carried on a carrier means, namely, a carrier ring 55. The carrier ring 55 is rotatably carried on a pair of upstanding supports 57 extending upwardly from the chassis 5, and extends completely around a bale 2 supported on the bale supporting rollers 50. The carrier ring 55 defines a central axis which in turn defines a second wrapping axis 56 about which the carrier ring 55 is rotatable for revolving the respective wrapping material dispensers 54 along a circular locus of travel defined by the carrier ring 55, so that the wrapping material dispensers 54 revolve around the bale 2 and about the second wrapping axis 56 simultaneously while the bale 2 is being rotated about the first wrapping axis 53 by the support rollers 50. The second wrapping axis 56 extends horizontally and parallel to the main central longitudinal axis 8 of the chassis 5, and thus perpendicularly to the first wrapping axis 53 about which the bale 2 is rotated on the bale supporting rollers 50.

Bearings (not shown) which are carried on the upstanding supports 57 rollably carry the carrier ring 55. Carrier rollers (not shown) mounted on side members 60 of the chassis 5 rollably engage the carrier ring 55. A second drive means, namely, a second drive motor (not shown) drives the carrier rollers (not shown) for in turn rotating the carrier ring 55 and in turn the wrapping material dispensers 54 about the second wrapping axis 56.

The first and second drive motors (not shown) are hydraulically powered motors, and are synchronised so that the respective rotational speeds of the bale supporting rollers 50 and the carrier ring 55 are synchronised for wrapping the bale.

The wrapping material dispensers 54 are conventional sheet wrapping material dispensers which support respective rolls 62 of plastics film sheet material, and are provided with tensioning rollers 63 for tensioning the film material as it is being drawn from the corresponding roll 62 for wrapping the bale.

The axes 52 of first and second bale supporting rollers 50 are contained in a horizontal plane 61 which is at a level slightly below the horizontal plane 49 containing the first pivot axis 35 for facilitating transfer of the bale 2 from the lower segment 19 of the baler onto the bale supporting rollers 50, see FIG. 7. It is envisaged that the horizontal plane 61 containing the axes 52 of the bale supporting rollers 50 may coincide with the horizontal plane 49 containing the first pivot axis 35, or indeed, in certain cases may be slightly above the horizontal plane 49 containing the first pivot axis 35. Although in this embodiment of the invention it is preferable that the horizontal plane 61 containing the central axes 52 of the bale supporting rollers 50 should be below or just below the horizontal plane 49 containing the first pivot axis 35.

Additionally, the baler 10 and the bale wrapper 11 are located on the chassis 5 relatively closely to each other so that the first bale supporting roller 50a is located relatively closely to the first pivot shaft 32, and in other words, to the bale forming roller 25a of the baler 10. However, a relatively short horizontal distance S (see FIG. 7) between the first pivot axis 35 and the central axis 52 of the first bale supporting roller 50a is required in order to accommodate some overhang of the bale 2 when supported on the bale supporting rollers 50 in order to avoid the bale supported on the bale supporting rollers 50 interfering with the baler 10. By keeping the horizontal distance S between the first pivot axis 35 and the central axis 52 of the first bale supporting roller 50a short, ease of transfer of the bale from the bale forming chamber 15 onto the bale supporting rollers 50 is facilitated, and additionally, the overall length of the baler/bale wrapper 1 is minimised.

Turning now to the support framework 51, the support framework 51 comprises a pair of L-shaped members 64 on respective opposite sides of the chassis 5, which are pivotally connected to the side member 60 of the chassis 5 by respective pivot shafts 65. The first bale supporting roller 50 is rotatably carried on the respective L-shaped members 64, while the second bale supporting roller 50 is rotatably carried on upstanding supports 66, which extend upwardly from the L-shaped members 64. Screws 67 rigidly secure the upstanding supports 66 to the L-shaped members 64. A ground engaging roller 68 is also rotatably carried between the L-shaped members 64.

A bale dispensing means provided by a pair of dispensing rams (not shown) mounted between the side members 60 of the chassis 5 and the corresponding L-shaped members 64 are provided for pivoting the support framework 51 around the pivot shafts 65 in the direction of the arrow E for dispensing a wrapped bale from the first and second bale supporting rollers 50 to the ground. The dispensing rams (not shown) pivot the support framework 51 in the direction of the arrow E until the ground engaging roller 68 engages the ground. On the wrapped bale having been dispensed from the first and second bale supporting rollers 50, the support framework 51 is returned by the dispensing rams to the position illustrated in FIG. 1 with the first and second bale supporting rollers 50 ready for receiving the next bale 2 from the bale forming chamber 15.

In use, the baler/bale wrapper 1 is hitched to a tractor, and the hydraulic and mechanical power supplies from the tractor are appropriately connected to the baler/bale wrapper for powering thereof. Rolls 62 of opaque plastics sheet film material are loaded in the wrapping material dispensers 54. The stationary, lower and upper arcuate segments 18, 19 and 20 are urged into the bale forming position illustrated in FIGS. 3, 4, 7 and 8a. As the baler/bale wrapper 1 is drawn forward by the tractor grass, hay, straw or other fibrous fodder material to be baled is picked up from the ground by the pick-up rake mechanism 45 and delivered into the bale forming chamber 15 through the inlet opening 42. As the fodder material is urged into the bale forming chamber 15, the rotating bale forming rollers 25 rotate the fodder material about the main central axis 16 for in turn forming a bale 2. On the bale being formed, netting from the roll of netting (not shown) mounted on the upper segment 20 is drawn into the bale forming chamber and wrapped around the formed bale in the bale forming chamber 15 for retaining the baled material together in the bale. This operation will be well known to those skilled in the art.

Figure 8A:
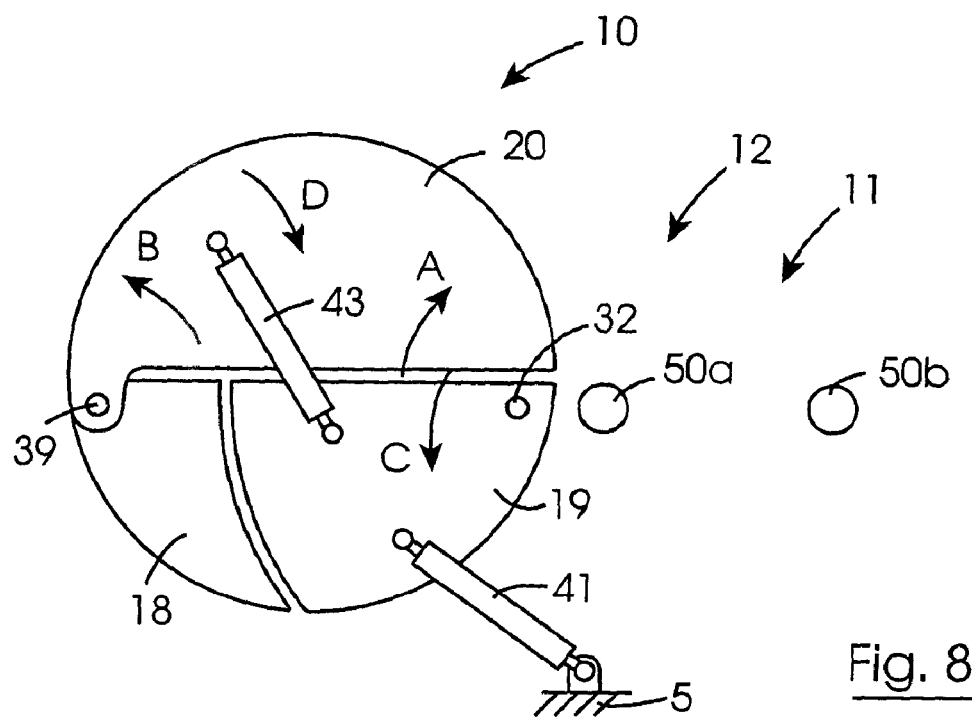
Figure 8D:
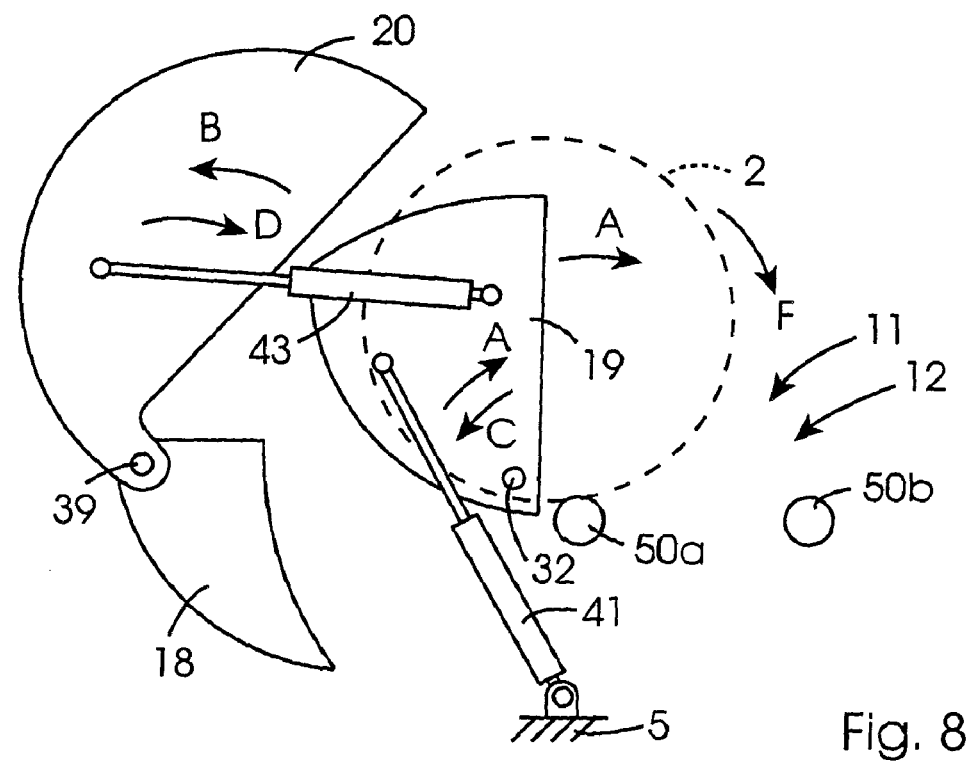
Figure 8B:
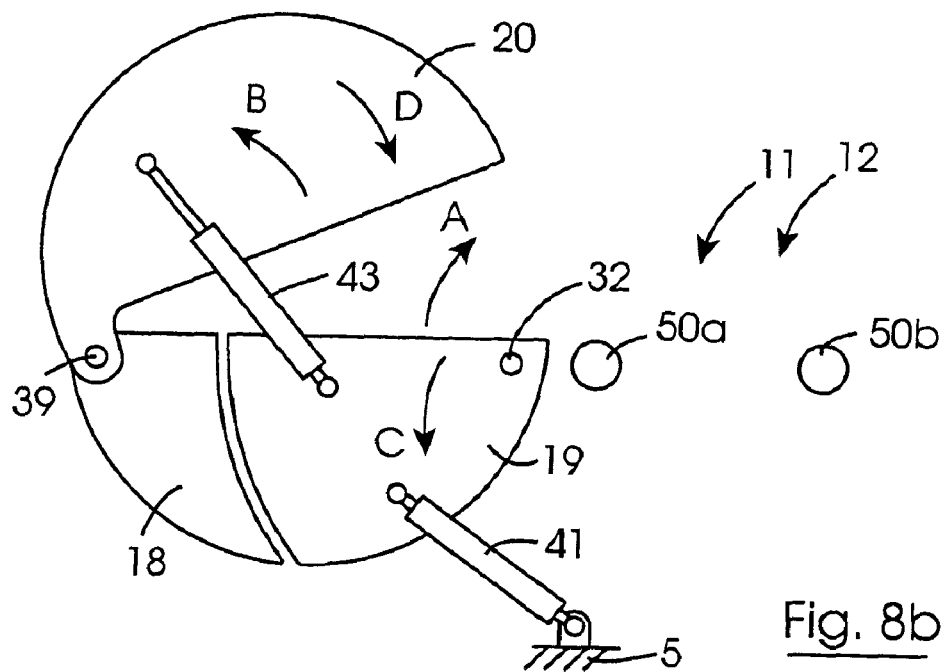
Figure 8C:
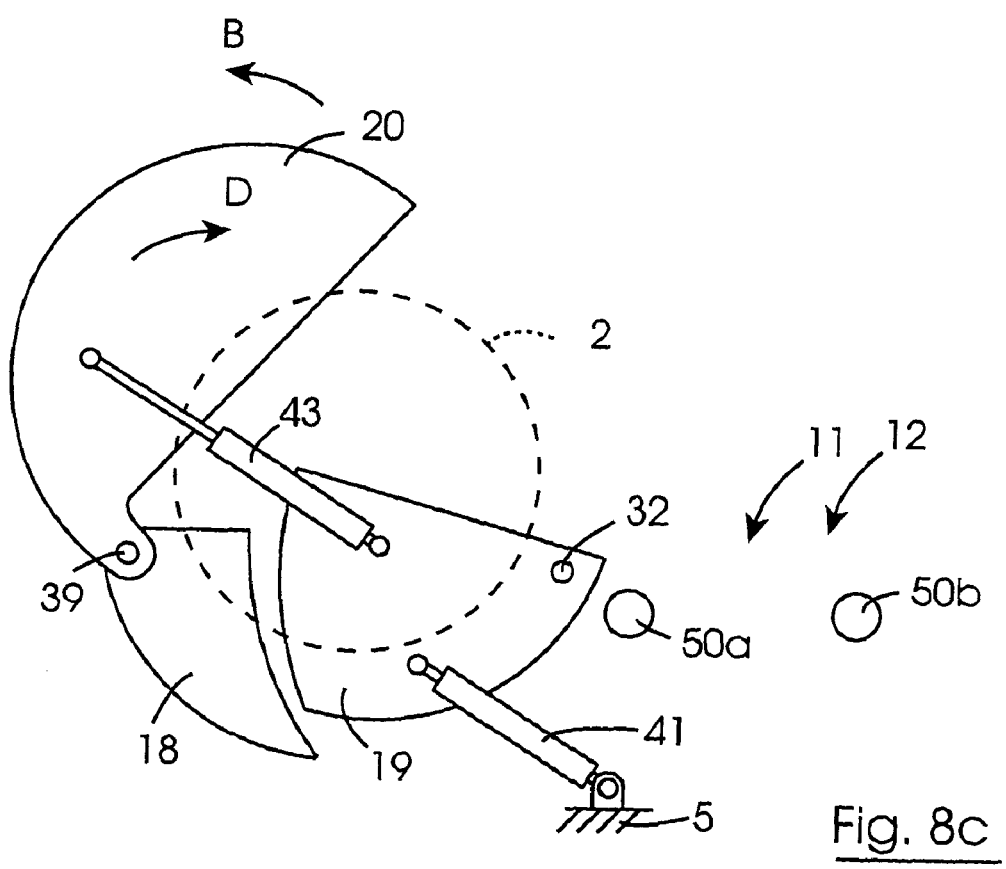

The upper arcuate segment 20 is then initially pivoted generally upwardly in the direction of the arrow B by the second rams 43, see FIG. 8b, for forming with the lower arcuate segment 19 the open mouth. After pivoting of the upper segment 20 from the bale forming position has commenced to a position substantially similar to that illustrated in FIG. 8b, the first rams 41 are activated for commencing pivoting of the lower segment 19 from the bale forming position in the direction of the arrow A, see FIG. 8c. The upper and lower segments 20 and 19, respectively, are simultaneously pivoted by the second and first rams 43 and 41, respectively in the directions of the arrows B and A, respectively until both the upper segment 20 and the lower segment 19 are in their respective discharge positions, see FIG. 8d.

As the lower segment 19 pivots from the bale forming position to the discharge position the lower segment 19 sweeps through the bale forming chamber 15 for urging the formed bale 2 in a generally upwardly rearwardly outwardly direction from the bale forming chamber 15, and effectively tips the bale 2 from the bale forming chamber 15 onto the first bale supporting roller 50, see FIG. 8d. Once the lower segment 19 is in the discharge position the centre of gravity of the formed bale 2 is located relative to the first bale supporting roller 50a for pivoting the bale 2 about the first bale supporting roller 50a in the direction of the arrow F, for continuing the transfer of the formed bale 2 onto the respective first and second bale supporting rollers 50, see FIG. 8d.

On the bale 2 being tipped from the lower segment 19 onto the first and second bale supporting rollers 50 the first rams 41 are operated for pivoting the lower segment 19 in the direction of the arrow C for returning the lower segment 19 to the bale forming position. After initial pivoting of the lower segment 19 from the discharge position has commenced, the second rams 43 are operated for pivoting the upper segment 20 from the discharge position to the bale forming position. The first and second rams 41 and 43 are operated so that the lower segment 19 is returned to the bale forming position just before the upper segment 20 is returned to the bale forming position. The pivoting of the upper and lower segments 20 and 19 by the second and first rams 43 and 41 is synchronised so that as the lower segment 19 is pivoting in the direction of the arrow A with a formed bale thereon, the upper segment 20 has been pivoted through a sufficient angle to provide clearance for the bale as it is being transferred from the bale forming chamber 15.

Once the formed bale 2 has been tipped by the lower segment 19 onto the bale supporting rollers 50, the bale supporting rollers commence rotating the bale around the first wrapping axis, namely, the horizontal geometric axis of the bale 2. Simultaneously, rotation of the carrier ring 55 about the second wrapping axis 56 is commenced, and film material from the wrapping material dispenser 54 is attached to the bale 2 being rotated on the first and second bale supporting rollers 50. Mechanisms for attaching the film material from the wrapping material dispensers 54 to the bale 2 as the dispensers 54 are revolved around the second wrapping axis 56 will be well known to those skilled in the art. As the carrier ring 55 rotates about the second wrapping axis 56 film material from the wrapping material dispensers 54 is wrapped onto the bale 2. Simultaneous rotation of the bale 2 about the first wrapping axis 53 and revolving of the wrapping material dispensers 54 about the second wrapping axis 56 cause the film wrapping material to be drawn from the dispensers 54 and wrapped in overlapping layers onto the bale 2.

On the bale 2 being wrapped, a cutting mechanism (not shown) associated with each of the wrapping material dispensers 54 cuts the film material, thus isolating the wrapped bale from the wrapping material dispensers 54. Such cutting mechanisms will be well known to those skilled in the art. The dispensing rams (not shown) are then operated for pivoting the carrier framework 51 about the pivot shafts 65 in the direction of the arrow E for dispensing the wrapped bale from the first and second bale supporting rollers 50 onto the ground. The dispensing rams are then operated in reverse for returning the supporting framework 51 for receiving the next formed bale from the baler 10.

While each bale is being wrapped on the bale wrapper 11 the next bale is simultaneously being formed in the bale forming chamber 15, and once the next bale 2 has been formed, transfer of the formed bale from the bale forming chamber 15 onto the first and second bale supporting rollers 50 is again carried out as already described, and so operation of the combined baler/bale wrapper 1 continues.

Referring now to FIGS. 9 to 17 there is illustrated a baler/bale wrapper indicated generally by the reference numeral 70, which comprises a baler 10 according to another embodiment of the invention. The baler/bale wrapper 70 is substantially similar to the baler/bale wrapper 1, and similar components are identified by the same reference numerals. However, in order to facilitate an understanding of the principle of the invention, only those components which are essential to the operating principle of the invention are clearly illustrated. The remaining components are assumed to be present.

The baler 10 of this embodiment of the invention is substantially similar to the baler 10 of the baler/bale wrapper 1, although in this case the lower segment 19 comprises only five bale forming rollers 25, and the bale forming rollers 25 extend through the angle φ in this embodiment of the invention of approximately 75° around the circumferential periphery of the bale forming chamber 15. A pair of mounting brackets 73 extending upwardly from the chassis 5 on respective opposite sides of the baler 10 pivotally and rotatably carry the first pivot shaft 32 about which the lower segment 19 is pivotal from the bale forming position to the discharge position for tipping a formed bale onto the bale wrapper 11.

First and second urging means provided by respective pairs of first and second rams 71 and 72 for urging the respective lower segment 19 and upper segment 20 between the bale forming position and their respective discharge positions are provided. The first rams 71 are located on respective opposite sides of the baler 10 and extend between respective pivot anchorages 74 on respective opposite sides of the chassis 5 and respective pivot anchorages 75 on the respective lower side walls 30 of the lower segment 19. The second rams 72 are located on respective opposite sides of the baler 10, and are connected between respective pivot anchorages 76 on the lower side walls 30 of the lower segment 19 and respective pivot anchorages 77 on the upper side walls 38 of the upper segment 20.

An hydraulic control circuit (not shown) which comprises a plurality of hydraulic valves (also not shown) controls the operation of the respective first and second rams 71 and 72 so that when the lower and upper segments 19 and 20 are in the bale forming position and a bale has been formed in the bale forming chamber 15, the second rams 72 are initially operated for pivoting the upper segment 20 about the second pivot axis 40 upwardly relative to the baler 10 for defining with the lower segment 19 the open mouth for facilitating transfer of a formed bale from the baler 10. After the second rams have pivoted the upper segment 20 through a sufficient angle to provide clearance for the bale being transferred by the bale forming chamber 15, the first rams 71 are operated for pivoting the lower segment 19 about the first pivot axis 35 upwardly for tipping the formed bale from the lower segment 19 onto to the bale wrapper 11.

Figure 10:
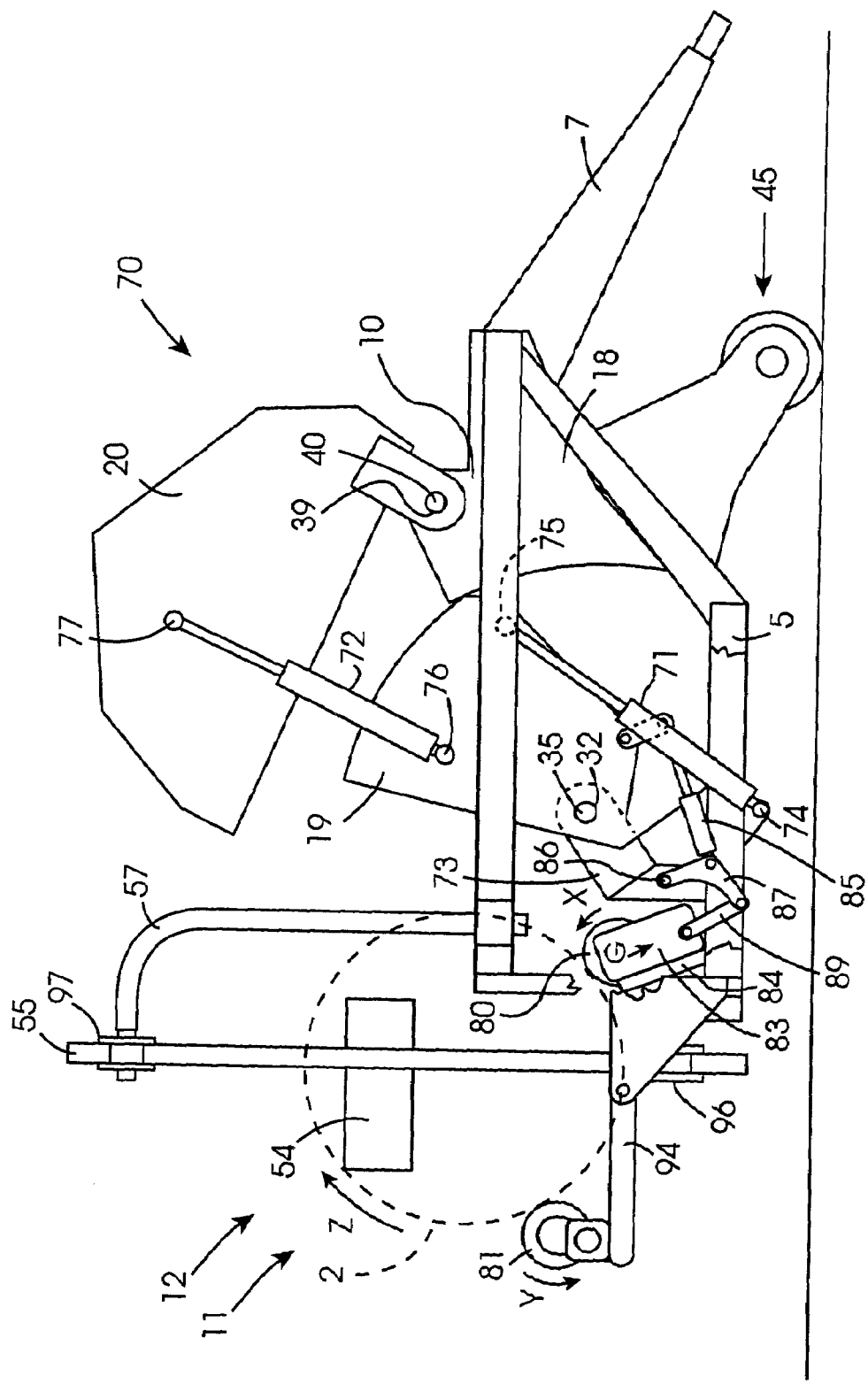
FIG. 10 is a view similar to FIG. 9 of the baler/bale wrapper of FIG. 9 illustrating portions of the baler/bale wrapper in a different position.
Figure 11:
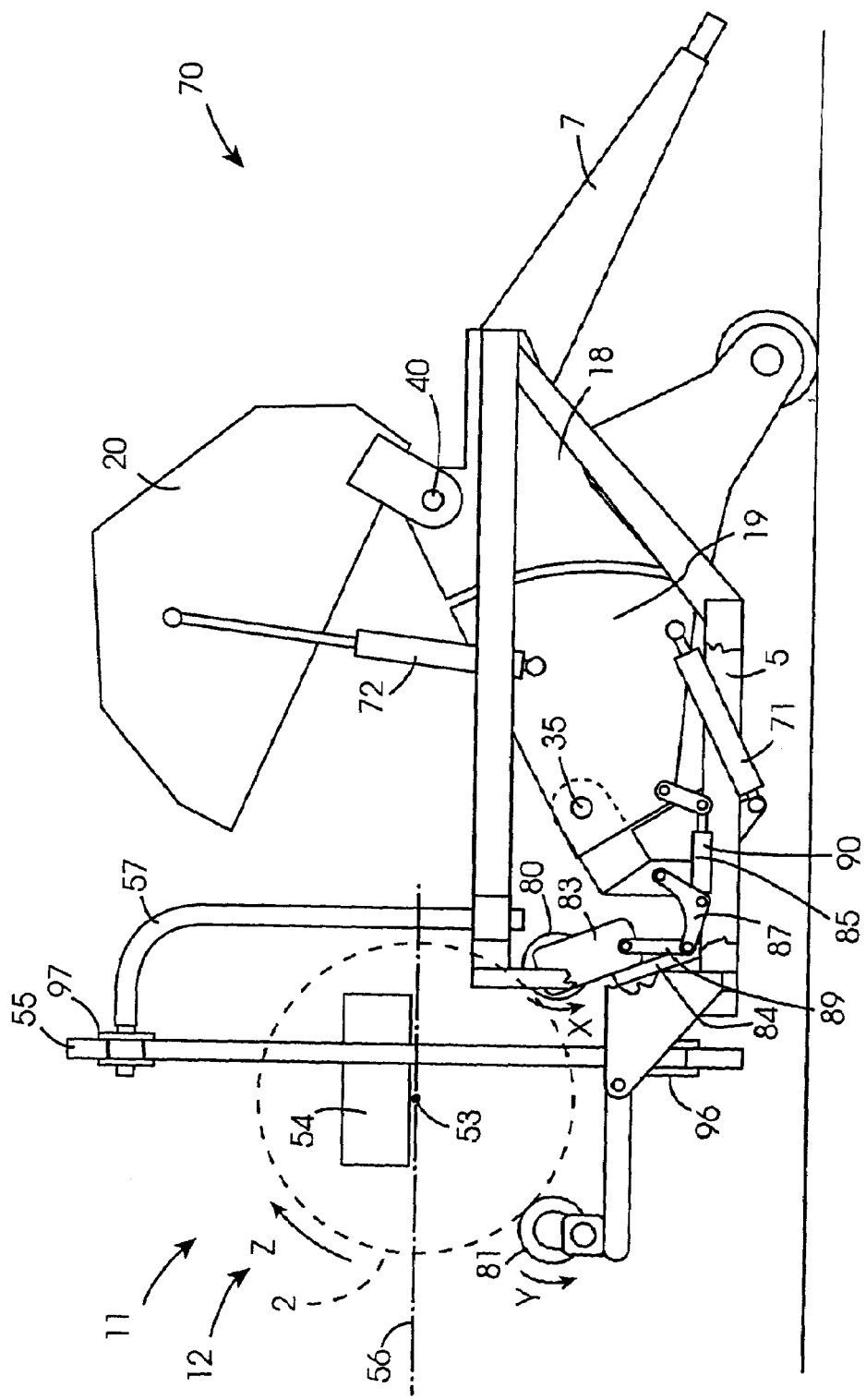
FIG. 11 is a view similar to FIG. 9 of the baler/bale wrapper of FIG. 9 illustrating a portion of the baler/bale wrapper in a different position.
Figure 12:
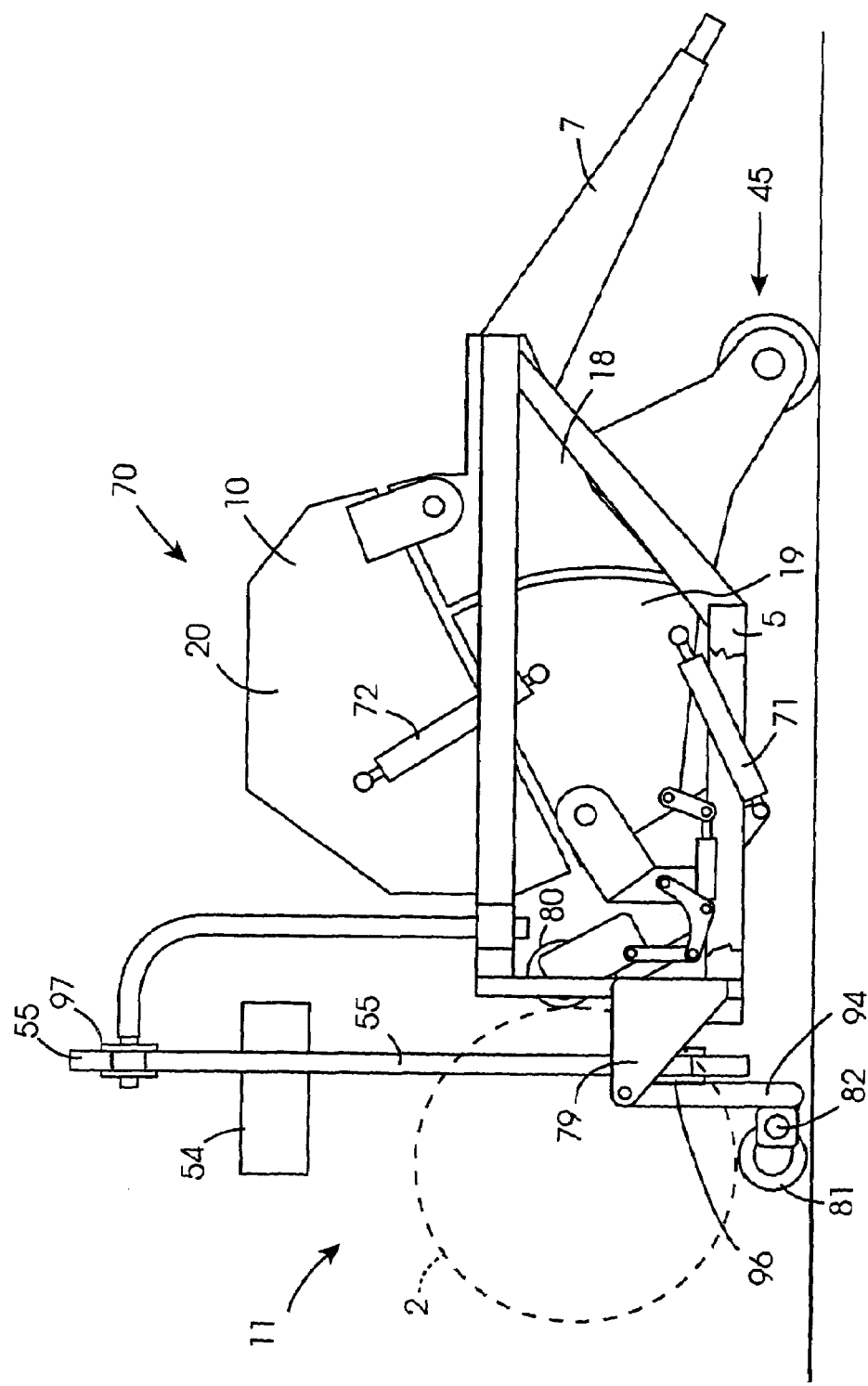
FIG. 12 is a view similar to FIG. 9 of the baler/bale wrapper of FIG. 9 illustrating another portion of the baler/bale wrapper in a different position.
Figures 13, 15:
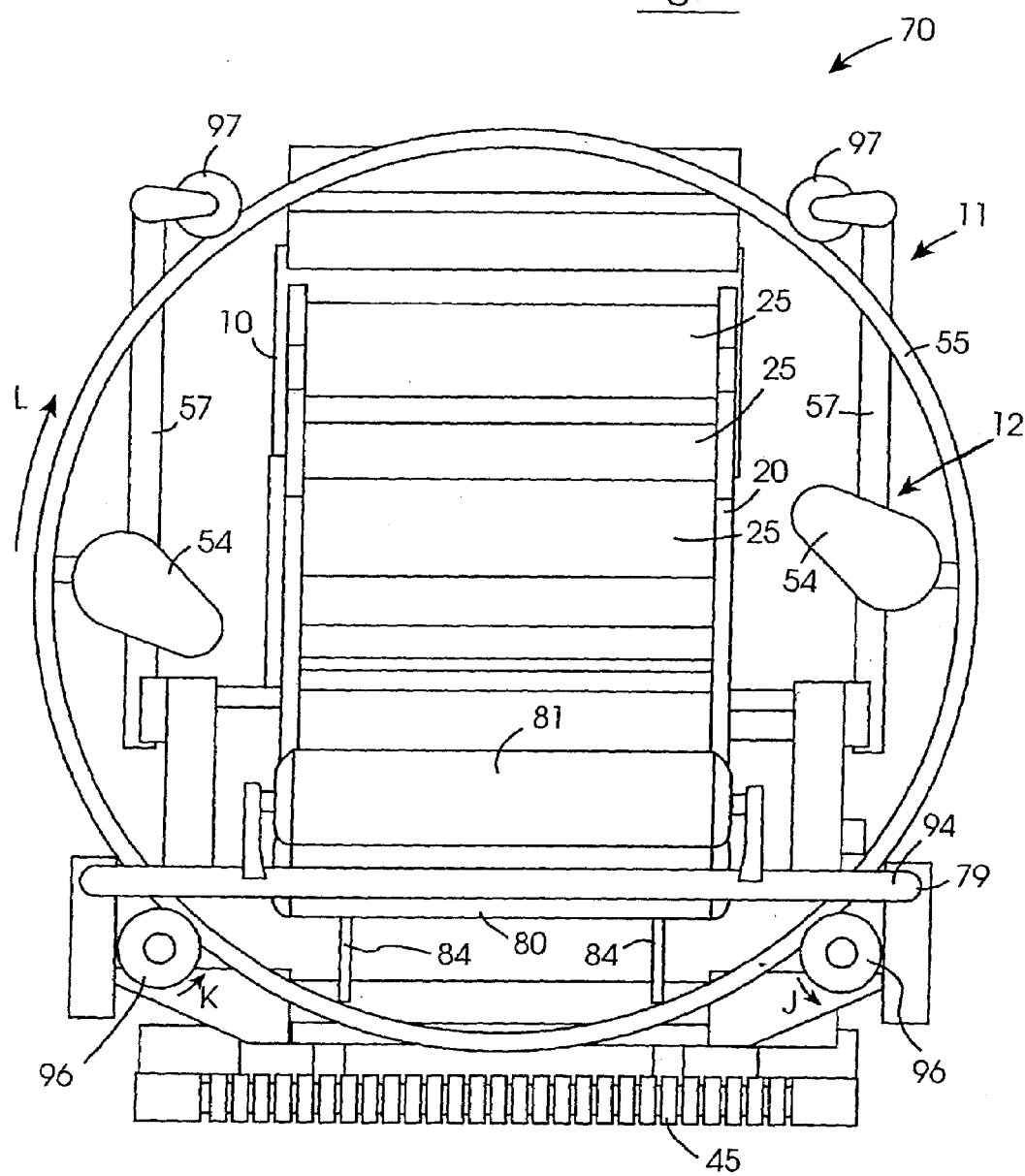
FIG. 13 is a rear end view of the baler/bale wrapper of FIG. 9.
FIG. 15 is a plan view of another detail of the baler/bale wrapper of FIG. 9.
Figure 17A:
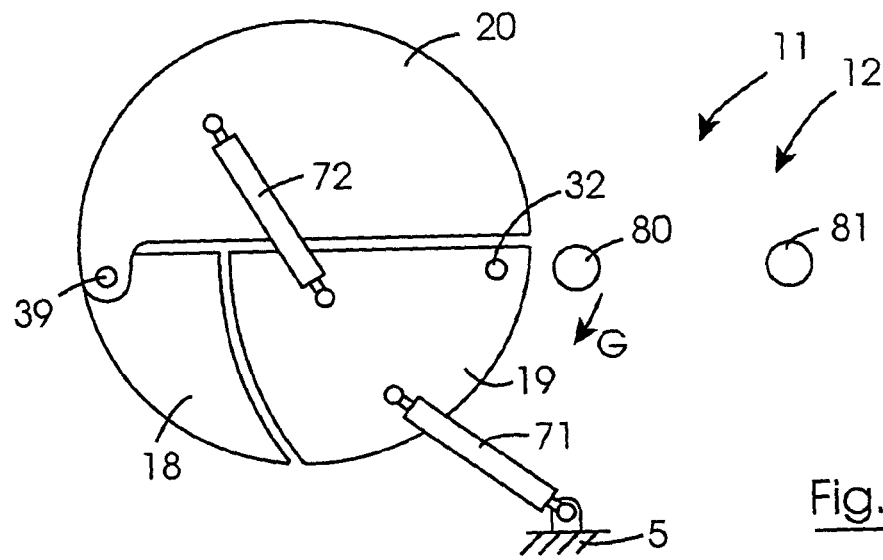
Figure 17D:
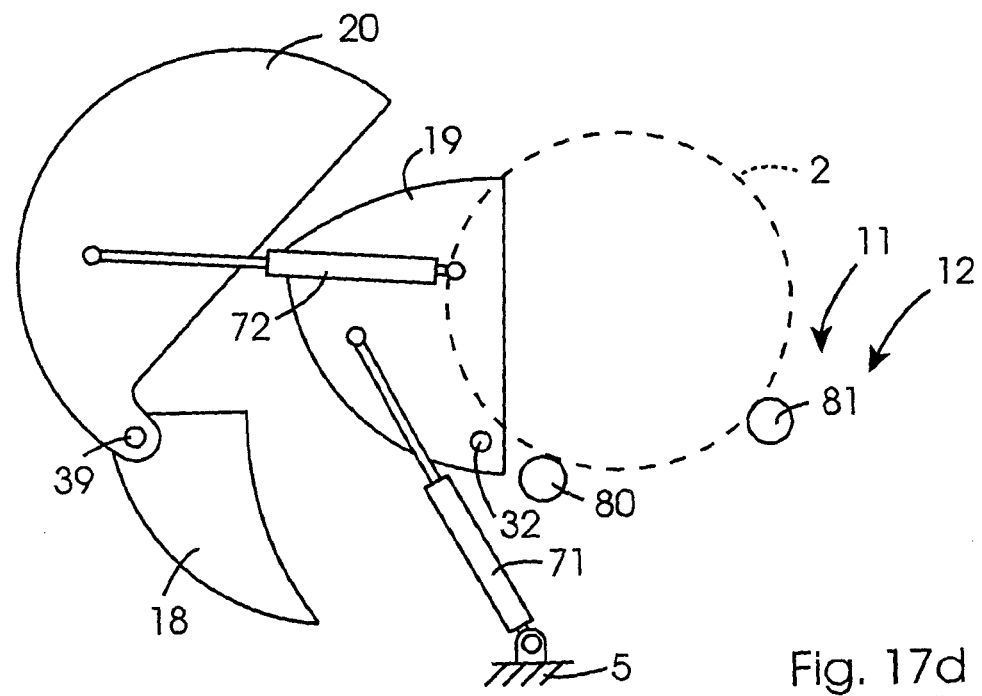
Figure 17B:
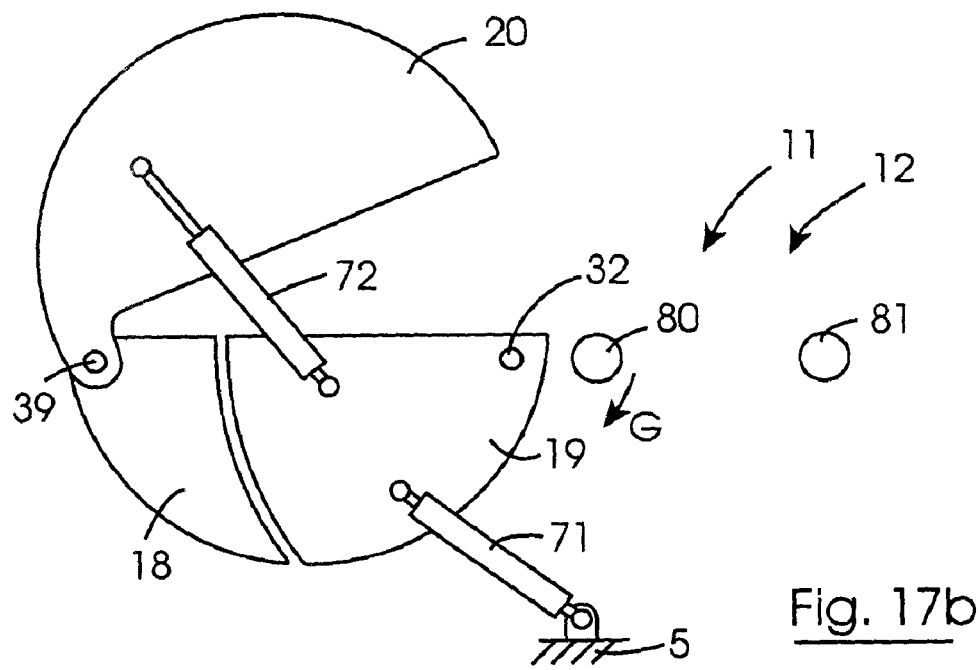

Turning now to the bale wrapper 11, the bale wrapper 11 comprises a support framework 79 extending rearwardly from the chassis 5. First and second bale supporting rollers 80 and 81, respectively, are supported on the support framework 79 for receiving a formed bale for wrapping from the baler 10. The first and second bale supporting rollers 80 and 81, respectively, are spaced apart from each other on the support framework 79 and extend parallel to each other and parallel to the main central axis 16 as in the case of the bale wrapper 11 of the baler/bale wrapper 1. However, in this embodiment of the invention the first bale supporting roller 80 is carried on a first roller carrier means, namely, a first carrier framework 83 which is slideably mounted on respective inclined guide tracks 84 located on the support framework 79 on respective opposite sides of the chassis 5. The first carrier framework 83 is slideable upwardly and downwardly for urging the first bale supporting roller 80 between an upper bale wrapping position as illustrated in FIGS. 9 and 17a and a lower bale receiving position as illustrated in FIGS. 10 and 17d for facilitating transfer of a formed bale from the lower segment 19 of the baler 10 onto the bale wrapper 11.

A connecting means comprising a pair of connecting linkage 85 on respective opposite sides of the baler 10 connects the first carrier framework 83 to the lower segment 19, so that as the lower segment 19 pivots from the bale forming position to the discharge position, the first carrier framework 83 is urged downwardly from the bale wrapping position into the lower bale receiving position for facilitating the transfer of a formed bale from the lower segment 19 onto the bale wrapper 11.

Each connecting linkage 85 comprises a pivot member 87 which is pivotally carried in the chassis 5 on a pivot shaft 86. A connecting rod 89 extending from the corresponding pivot member 87 connects the corresponding pivot member 87 to the first carrier framework 83 at corresponding side thereof. The connecting rods 89 are pivotally connected to the first carrier framework 83 and to the corresponding pivot members 87. A telescoping connecting rod 90 connects the corresponding pivot members 87 to corresponding lower side wall 30 of the lower segment 19 for facilitating limited free movement between the lower segment 19 and the pivot members 87, and in turn the first carrier framework 83. The telescoping connecting rods 90 are connected to the corresponding pivot members 87 by pivotal connections 91 and to the respective lower side walls 30 of the lower segment 19 by pivot anchorages 92. During pivotal travel of the lower segment 19 from the bale forming position to the discharge position the travel of the pivotal anchorage 92 is greater than the required travel of the first carrier framework 83 between the bale wrapping position and the lower bale receiving position, and thus the greater travel of the pivot anchorages 92 relative to the pivot connections 91 is accommodated by the telescoping connecting rods 90.

Additionally, the support framework 79 comprises a second roller carrier means, namely, a second carrier framework 94 which carries the second bale supporting roller 81. The second carrier framework 94 is pivotally connected to the support framework 79 by pivot pins 95, and is pivotal between a first position with the second bale supporting roller 81 in the bale wrapping position, see FIG. 9, and a second position with the second bale supporting roller 81 in a lower bale dispensing position, see FIG. 12, for facilitating dispensing of a wrapped bale from the bale wrapper 11 onto the ground. A pair of dispensing hydraulic rams (not shown) connected between the support framework 79 and the second carrier framework 94 pivot the second carrier framework 94 between the first and second positions, and in turn the second bale supporting roller 81 between the bale wrapping position and the lower bale dispensing position, respectively.

An hydraulic motor (not shown) is located on the first carrier framework 83 for rotating the first bale supporting roller 80. An hydraulic motor 82 is mounted on the second carrier framework 94 for rotating the second bale supporting roller 81. The first and second bale supporting rollers 80 and 81 are rotated in the directions of the arrows X and Y for rotating the formed bale 2 about the first wrapping axis 53 in the direction of the arrow Z.

The wrapping material dispensers 54 are illustrated in block representation mounted on the carrier ring 55. The carrier ring 55 is carried on a pair of carrier rollers 96, which are in turn rotatably carried on the support framework 79. Hydraulic motors (not shown) mounted on the support framework 79 drive the carrier rollers 76 in the directions of the arrows J and K, for in turn rotating the carrier ring 55 about the second wrapping axis 56 in the direction of the arrow L, see FIG. 13. A pair of idler guide rollers 97 carried on the upstanding supports 57 retain the carrier ring 55 in a vertical plane. The carrier rollers 96 and the guide rollers 97 are flanged rollers, see FIG. 15 for engaging and retaining the carrier ring 55 in a vertical plane.

Figure 16:
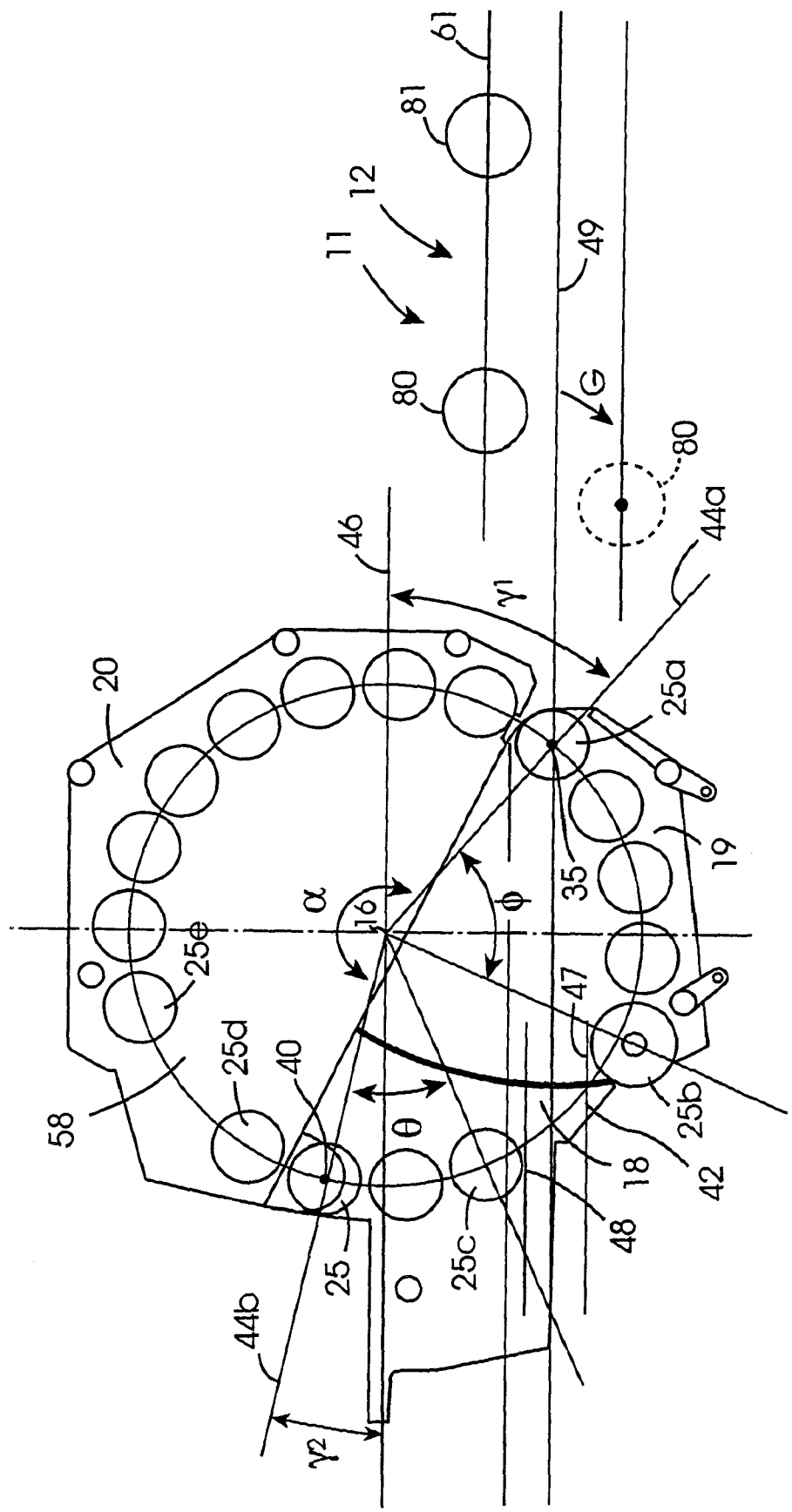
FIG. 16 is a partly diagrammatic side elevational view of the baler/bale wrapper of FIG. 9, FIGS. 17a to 17d are diagrammatic side elevational views of the baler/bale wrapper of FIG. 9, in use.

In this embodiment of the invention the first and second pivot axes 35 and 40 are not contained in a common plane with the central pivot axis 16 of the bale forming chamber 15, see FIG. 16. Rather, the first pivot axis 35 is contained in a plane 44a with the main central axis 16 while the second pivot axis 40 is contained in a plane 44b with the main central axis 16. The plane 44a which contains the first pivot axis 35 and the main central axis 16 makes an angle $\gamma^1$ with the horizontal axis 46 through the main central axis 16 of approximately 40°. The plane 44b which contains the second pivot axis 40 and the main central axis 16 makes an angle $\gamma^2$ of approximately 13° with the horizontal axis 46. Accordingly, the first and second pivot axes 35 and 40 are spaced apart an angle $\alpha$ about the main central axis 16 of approximately 207° on the upward side of the bale forming chamber 15. The bale forming rollers 25 of the stationary segment 18 extend around the circumferential periphery of the bale forming chamber an angular distance $\theta$ of approximately 30°.

Accordingly, in this embodiment of the invention the first pivot axis is located in the circumferential periphery of the bale forming chamber an angular distance below the horizontal axis 46 an angular distance $\gamma^1$ of approximately 40°. The second pivot axis 40 is located in the circumferential periphery of the bale forming chamber 15 above the horizontal plane 46 an angular distance $\gamma^2$ of approximately 13°. In this embodiment of the invention the first pivot axis 35 is located above the lower edge 47 of the inlet opening 42 but below the upper edge 48 of the inlet opening 42. In fact, the first pivot axis 35 is located at a level below the horizontal axis 46 which substantially coincides with a midway position between the lower edge 47 and the upper edge 48 of the inlet opening 42. However, as can be seen from FIG. 16 the bale forming roller 25a which is rotatable about the first pivot axis 35 is of diameter such that the upper level of the bale forming roller 25a is above the level of the inlet opening 42 to the bale forming chamber 15, and thus, the bale is discharged from the bale forming chamber at a level which is entirely above the inlet opening 42.

The central axes 52 of the first and second bale supporting rollers 80 and 81 when in the bale wrapping position are contained in the horizontal plane 61. However, the horizontal plane 61 when the first and second bale supporting rollers 80 and 81 are in the bale wrapping position is at a level above the horizontal plane 49 of the first pivot axis 35. However, when the first bale supporting roller 80 is in the bale receiving position, the first bale supporting roller 80 is at a level below the horizontal plane 49 of the first pivot axis 35 for thereby facilitating direct transfer of the bale from the bale forming chamber 15 onto the first and second bale supporting rollers 80 and 81.

Otherwise the baler/bale wrapper 70 is substantially similar to the baler/bale wrapper 1, and its operation is also substantially similar.

In use, material to be baled, for example, grass, hay, straw or the like is picked up by the pick-up mechanism 45 and fed into the bale forming chamber 15 where it is rotated about the main central axis 16 and formed into a bale. On the bale being formed netting from the roll of netting (not shown) mounted on the upper segment 20 is drawn into the bale forming chamber and wrapped around the formed bale in the bale forming chamber 15 for retaining the baled material together in the bale. The first and second hydraulic rams 71 and 72 are then operated in sequence for initially pivoting the upper segment 20 from the bale forming position towards the discharge position for defining the open mouth with the lower segment 19, see FIG. 17b. While the upper segment 20 is pivoting towards the discharge position, pivoting of the lower segment 19 upwardly from the bale forming position to the discharge position commences for tipping the bale upwardly rearwardly directly from the bale forming chamber 15 onto the bale wrapper 11, see FIG. 17c.

Figure 17C:
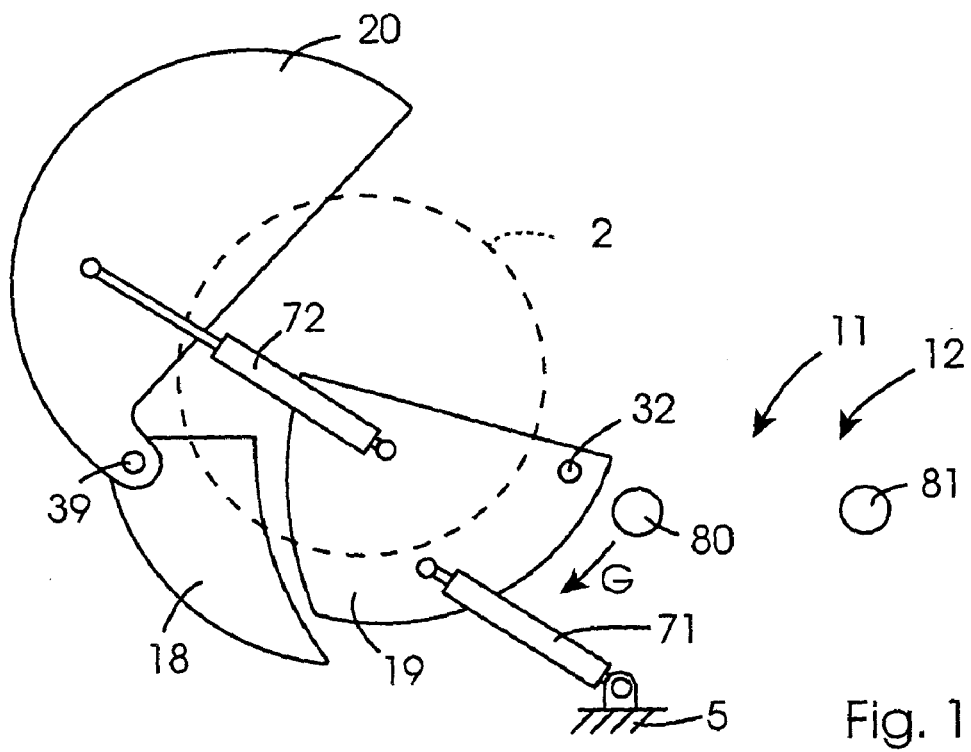

As the lower segment 19 is being pivoted upwardly by the second rams 72 the first bale supporting roller 80 is urged downwardly in the direction of the arrow G from the bale wrapping position to the bale receiving position for facilitating transfer of the bale from the lower segment 19 onto the bale wrapper 11, see FIGS. 17c and 17d. When the lower segment 19 has pivoted into the bale discharge position, the first bale supporting roller 80 is in the bale receiving position, see FIG. 16d, thereby facilitating ease of transfer of the bale from the lower segment 19 onto the first and second bale supporting rollers 80 and 81.

The first and second rams 71 and 72 are then operated in the reverse sequence for initially commencing return of the lower segment 19 to the bale forming position, and while the lower segment 19 is being returned to the bale forming position, return of the upper segment 20 to the bale forming position is commenced. The lower segment 19 and the upper segment 20 are returned to the bale forming position with the lower segment 19 reaching the bale forming position just before the upper segment 20 reaches the bale forming position. As the lower segment 19 is being returned to the bale forming position, the first bale supporting roller 80 is raised into the bale wrapping position, and the bale wrapper 11 is ready to wrap the bale.

The first and second bale supporting rollers 80 and 81 are rotated in the direction of the arrows X and Y for rotating the bale about the first wrapping axis 53. Simultaneously the carrier ring 55 is rotated about the second wrapping axis 56 in the direction of the arrow L by the carrier rollers 96 for in turn simultaneously revolving the wrapping material dispensers 54 around the bale 2. As the bale 2 is being rotated about the first wrapping axis 53 and the wrapping material dispensers 54 are being revolved about the second wrapping axis 56, film material is dispensed onto the formed bale 2 for wrapping thereof.

When the bale 2 has been wrapped the second carrier framework 94 is pivoted from the first position to the second position, for in turn pivoting the second bale supporting roller 81 to the lower bale dispensing position for dispensing the wrapped bale 2 from the bale wrapper 11 to the ground.

While the bale 2 on the bale wrapper 11 is being wrapped, the next bale is being formed simultaneously in the bale forming chamber 15, and so operation of the combined baler/bale wrapper 70 continues.

In both the baler/bale wrappers 1 and 70 according to the invention the main central longitudinal axis 8 defined by the baler/bale wrapper 1 extends substantially horizontally and longitudinally of the baler/bale wrapper 1. The main central axis 16 defined by the bale forming chamber 15 extends transversely of the main central longitudinal axis 8 and also horizontally. Accordingly, the first and second pivot axes 35 and 40, respectively, also extend transversely of the main central longitudinal axis 8 and also horizontally. The roller axes of the respective first and second bale supporting rollers 50 of the bale/bale wrapper 1, and the roller axes of the respective first and second bale supporting rollers 80 and 81 of the baler/bale wrapper 70 also extend transversely of the main central longitudinal axis 8 and horizontally. In fact, the roller axes of the first and second bale supporting rollers and the first and second pivot axes 35 and 40 all extend parallel to the main central axis 16 defined by the bale forming chamber 15. The first wrapping axis 53 of the bale during wrapping in the bale wrapper 11 also extends horizontally and parallel to the main central axis 16 defined by the bale forming chamber 15, while the second wrapping axis 56 about which the wrapping material dispensers 54 are revolved extends parallel to the main central longitudinal axis 8. Additionally the first and second wrapping axes extend horizontally, and in many cases may lie in a common horizontal plane. It is this arrangement of the baler 10 and the bale wrapper 11 on the chassis 5 which provides the combined baler/bale wrappers 1 and 70 according to the invention with their many advantages hereinbefore described over and above combined baler/bale wrappers known heretofore.

As discussed above, the first bale supporting roller is located as close as possible to the first pivot axis 35 so that the distance S between the rotational axis of the first bale supporting roller and the first pivot axis is as small as possible. However, in order to accommodate an overhang of the bale on the bale supporting rollers of the bale wrapper between the first bale supporting roller and the baler, it is desirable that the rotational axis of the first supporting roller should be spaced apart from the first pivot axis. In general, it has been found that by arranging the baler and the bale wrapper relative to each other on the chassis so that the horizontal distance between a vertical plane extending through the main central axis of the bale forming chamber and a vertical plane extending through the first wrapping axis lies in the range of a distance corresponding to the diameter of the bale plus 300 mm and a distance corresponding to the diameter of the bale plus 800 mm a desirable relative location between the baler and the bale wrapper is achieved.

Figure 18A:
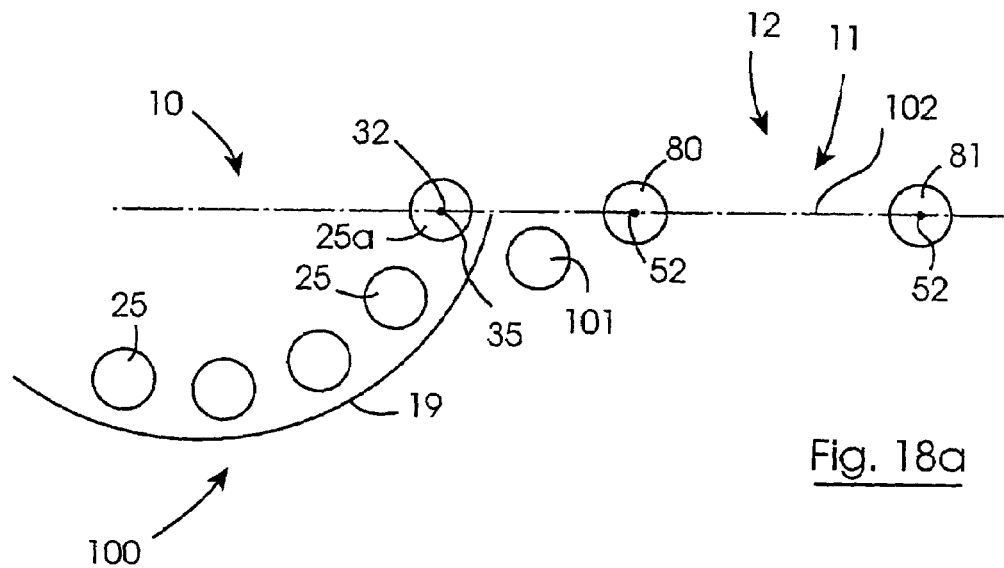
FIGS. 18a and 18b are diagrammatic side elevational views of a detail of a combined baler/bale wrapper according to a further embodiment of the invention.
Figure 18B:
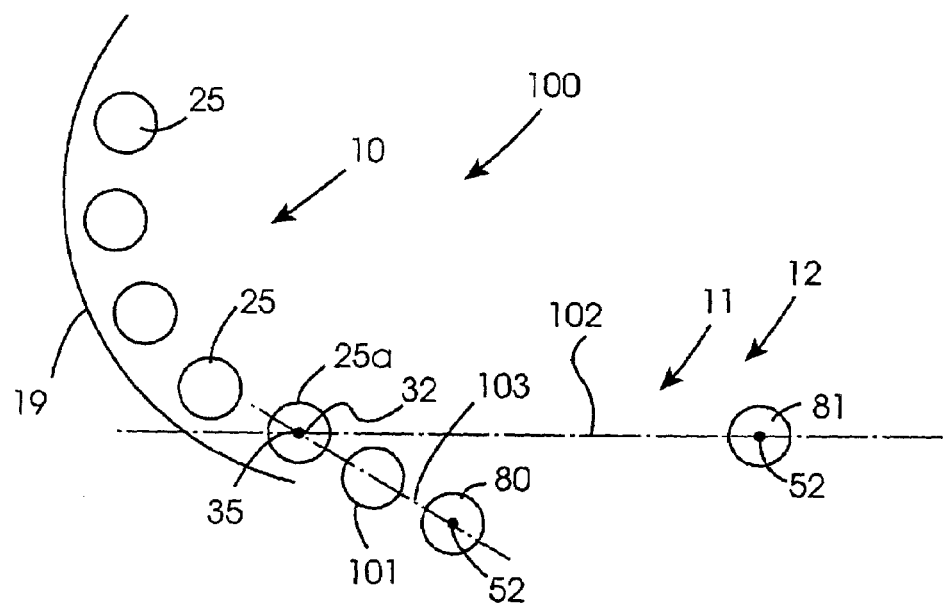

Referring now to FIGS. 18a and 18b, there is illustrated a portion 100 of another combined baler/bale wrapper. The baler/bale wrapper 100 is substantially identical to the baler/bale wrapper 70, and similar components are identified by the same reference numerals. The only part of the baler/bale wrapper 100 which is different to that of the baler/bale wrapper 70 is in the portion which is diagrammatically illustrated in FIGS. 18a and 18b. In this embodiment of the invention an intermediate roller 101 is disposed between the baler 10 and the bale wrapper 11 for supporting each bale 2 as it is being transferred from the bale forming chamber 15 of the baler 10 onto the first and second bale supporting rollers 80 and 81 of the bale wrapper 11. The intermediate roller 101 is rotatably carried in a fixed position on the chassis 5, and extends parallel to the main central axis 16 defined by the bale forming chamber 15. Thus, the intermediate roller 101 is parallel to the first pivot axis 35 of the lower segment 19 of the baler 10 and extends also parallel to the first and second bale supporting rollers 80 and 81 of the bale wrapper 11. The intermediate roller 101 is located between the first pivot axis 35, and thus the bale forming roller 25a of the lower segment 19 and the first bale supporting roller 80, and is located relatively closely to the respective bale forming roller 25a and the first bale supporting roller 80. In this embodiment of the invention the roller axes 52 of the first and second bale supporting rollers 80 and 81 and the first pivot axis 35 of the lower segment 19 lie in a common horizontal plane 102 when the first and second bale supporting rollers 80 and 81 are in the bale wrapping position. When the first and second bale supporting rollers 80 and 81 and the first pivot axis 35 lie in the common horizontal plane 102, the intermediate roller 101 is located at a level below the common horizontal plane 102. However, when the first bale supporting roller 80 takes up the bale receiving position, the intermediate roller 101 lies in an inclined common plane 103 with the first pivot axis 35 and the roller axis 52 of the first bale supporting roller 80 for facilitating ease of transfer of the bale 5 directly from the bale forming chamber 15 onto the first and second bale supporting rollers 80 and 81 when the first bale supporting roller 80 is in the bale receiving position.

Otherwise, the baler/bale wrapper 100 is similar to the baler/bale wrapper 70 described with reference to FIGS. 9 to 17, and its use and operation is also similar. The provision of the intermediate roller 101 which is located in a fixed position relative to the baler 1 and the bale wrapper 11 assists in the smooth transfer of the bale from the bale forming chamber 15 to the bale wrapper 11, and also acts to support the bale as it is being transferred from the bale forming chamber 15 to the bale wrapper 11. Although in the embodiment of the invention described the intermediate roller 101 is an idler roller, the intermediate roller 101 may be a driven roller for assisting in the transfer of the bale from the bale forming chamber 15 to the first and second bale supporting rollers 80 and 81.

It is envisaged that other suitable connecting means for connecting the first bale supporting roller to the lower segment of the baler besides the connecting linkage described with reference to FIGS. 9 to 17 may be provided. For example, in certain cases, it is envisaged that the first bale supporting roller may be carried on a support rigidly extending from the lower segment which would extend rearwardly from the lower segment beyond the first pivot axis, so that as the lower segment is being pivoted upwardly from the bale forming position the support member and the first bale supporting roller would pivot downwardly into the bale receiving position.

It is also envisaged that the discharge means instead of being provided by a lower arcuate segment of the baler may be formed by any lower portion of the baler, for example, it is envisaged that one or more of the bale forming rollers could be mounted on a pivotally mounted carrier arm, which would be pivotally mounted relative to the baler for urging the bale one or more bale forming rollers inwardly into the bale forming chamber in a generally upwardly direction for discharging the bale upwardly outwardly from the bale forming chamber. It is also envisaged that side portions of, for example, the lower segment could be operable for clamping the bale therebetween and for discharging the bale upwardly outwardly of the bale forming chamber. It is also envisaged that the discharge means may be provided by an urging member which would not form part of the bale forming chamber, and which would be urgeable into the bale forming chamber for in turn discharging the bale upwardly outwardly of the bale forming chamber. Such a discharge means could be located externally of the bale forming chamber and would be operable to extend into and traverse the bale forming chamber for discharging the bale therefrom.

Further, it is envisaged that the discharge means could be provided by a means for rotating the rollers in the lower segment, and indeed, possibly in the stationary segment when the upper segment is pivoted into the discharge position for urging the bale from the bale forming chamber.

While the baler of the baler according to the invention has been described as being fixed chamber balers whereby the bale forming chamber is formed by bale forming rollers, it is envisaged that the baler may be of the fixed chamber type in which the bale forming chamber instead of being defined by bale forming rollers is defined by a bale forming belt or belts, whereby the belt or belts define a bale forming chamber. Such a baler is disclosed in U.S. Pat. No. 4,176, 596 of Welger. Alternatively, the bale forming chamber may be defined by a plurality of slats carried on one or more chains or pairs of chains which define a bale forming chamber. The baler may also be of the type disclosed in U.S. Pat. No. 4,651,512 of Texas Industries, which is considered to be a fixed chamber baler, although a portion of the periphery of the bale forming chamber is moveable inwardly into the bale forming chamber for compressing the material in the bale forming chamber initially when bale forming commences, until the bale diameter increases. The baler may also be of the type disclosed in U.S. Pat. No. 4,566,379. However, in all such cases, the baler would be arranged with a discharge means for urging the bale in a generally upwardly outwardly direction from the bale forming chamber, and in particular, in a direction whereby the bale is discharged along a locus of transfer extending in a general upward direction between a vertical direction and a horizontal direction.

It is envisaged that while the various motors for driving the various components of the baler and the bale wrapper have been described as being hydraulic motors, any other suitable motors whether electrically powered, pneumatically powered or otherwise could be provided. It is also envisaged that the first and second urging means for urging the lower and upper segments of the baler between the bale forming position and the discharge position may be provided by any suitable urging means and where provided by rams could be provided by pneumatic rams.

While the balers described with reference to FIGS. 1 to 18 have been described as forming part of a combined baler/bale wrapper, it will be readily apparent to those skilled in the art that the baler according to the invention may be provided as a single unit without the bale wrapper. In such cases, it is envisaged that the balers according to the invention would be particularly suitable for use in conjunction with a bale accumulator, whereby bales formed by the baler could be accumulated for subsequent discharge. The bale accumulator could be provided as a part integrally formed with the baler, or may be provided as a separate trailed unit, which would be attached to and trailed behind the baler. The particular advantage of the balers according to the invention is that by virtue of the fact that the bales are discharged in a generally upwardly direction between a vertical direction and a horizontal direction, the bales can be discharged directly into the bale accumulator, thereby facilitating the provision of a relatively high slung accumulator. Needless to say, the baler according to the invention may be provided in conjunction with any other apparatus besides a bale wrapper or a bale accumulator, and as discussed above, may be provided as a single unit.

The invention claimed is:

1. A fixed chamber baler for forming a cylindrical bale of material, the baler comprising:
a bale forming chamber defining the bale, and within which the bale is formed, the bale forming chamber defining a geometrical main central axis and being formed by arcuate segments which form a circumferential periphery of the bale forming chamber, one of which arcuate segments is a lower arcuate segment, and
a discharge means for discharging a formed bale from the bale forming chamber, the discharge means being formed by the lower arcuate segment, the lower arcuate segment being operable in a bale forming position co-operating with the other ones of the arcuate segments for defining the bale forming chamber and for forming the bale in the bale forming chamber, and being moveable in a generally upwardly direction into the bale forming chamber for discharging the bale from the bale forming chamber in a general upwardly outwardly direction therefrom.

2. A baler as claimed in claim 1 in which the lower arcuate segment traverses through the bale forming chamber for urging the bale from the bale forming chamber.

3. A baler as claimed in claim 1 in which the lower arcuate segment traverses through the main central axis of the bale forming chamber for urging the bale from the bale forming chamber.

4. A baler as claimed in claim 1 in which the lower arcuate segment discharges the bale from the bale forming chamber along a locus of discharge extending in a general direction between a vertical direction and a horizontal direction.

5. A baler as claimed in claim 4 in which the locus of discharge along which the lower arcuate segment discharges the bale from the bale forming chamber is a generally arcuate locus.

6. A baler as claimed in claim 1 in which the lower arcuate segment is moveable from a the bale forming position to a discharge position for discharging the bale from the bale forming chamber.

7. A baler as claimed in claim 1 in which the lower arcuate segment is pivotally mounted about a first pivot axis and is pivotal in the generally upwardly direction into the bale forming chamber from the bale forming position about the first pivot axis for tipping the bale from the bale forming chamber.

8. A baler as claimed in claim 7 in which the first pivot axis is parallel to the main central axis defined by the bale forming chamber.

9. A baler as claimed in claim 1 in which the lower arcuate segment extends around the circumferential periphery of the bale forming chamber an angular distance in the range of 50° to 160°.

10. A baler as claimed in claim 7 in which an upper arcuate segment of the arcuate segments which form the circumferential periphery of the bale forming chamber is moveable between a bale forming position co-operating with the other ones of the arcuate segments for forming the bale forming chamber and a discharge position defining with the other ones of the arcuate segments an open mouth to the bale forming chamber for facilitating discharge of the bale from the bale forming chamber by the lower arcuate segment.

11. A baler as claimed in claim 10 in which the upper arcuate segment is pivotally mounted about a second pivot axis and is pivotal about the second pivot axis between the bale forming position and the discharge position, the second pivot axis being parallel to the first pivot axis and being located adjacent the circumferential periphery of the bale forming chamber, and being spaced apart from the first pivot axis an angular distance of at least 180° around the main central axis of the bale forming chamber.

12. A baler as claimed in claim 10 in which the upper arcuate segment and the lower arcuate segment are sequentially operable from the bale forming position, whereby movement of the upper arcuate segment from the bale forming position commences prior to movement of the lower arcuate segment from the bale forming position.

13. A baler as claimed in claim 10 in which the bale forming chamber is mounted on a chassis, a first urging means is provided for urging the lower arcuate segment from the bale forming position, and a second urging means is provided for urging the upper arcuate segment between the bale forming position and the discharge position, the first urging means acting between the lower arcuate segment and the chassis.

14. A baler as claimed in claim 1 in which a bale forming means is provided for forming the material into a bale.

15. A baler as claimed in claim 4 in which the locus of discharge along which the lower arcuate segment discharges the bale from the bale forming chamber extends in a generally radial direction relative to the main central axis.

16. A baler as claimed in claim 7 in which the first pivot axis is located adjacent the circumferential periphery of the bale forming chamber within an arc extending not more than 30° above, and not more than 60° below a horizontal plane containing the main central axis of the bale forming chamber.

17. A baler as claimed in claim 9 in which the lower arcuate segment extends around the circumferential periphery of the bale forming chamber an angular distance in the range of 60° to 115°.

18. A baler as claimed in claim 10 in which the upper arcuate segment extends around the circumferential periphery of the bale forming chamber through an angular distance of up to 180°.

19. A baler as claimed in claim 11 in which one of the arcuate segments is a stationary arcuate segment, the stationary arcuate segment extending along the circumferential periphery between the respective upper and lower arcuate segments, the first pivot axis being located remote from the stationary arcuate segment and the second pivot axis being located adjacent the stationary arcuate segment.

20. A baler as claimed in claim 13 in which the second urging means acts between the moveable upper arcuate segment and the moveable lower arcuate segment.

21. A baler as claimed in claim 13 in which an inlet is provided to the bale forming chamber through which material to be baled is fed into the bale forming chamber, the inlet being located at a level such that the bale is discharged from the bale forming chamber by the discharge means at a level above the level of the inlet.

22. A baler as claimed in claim 21 in which the chassis defines a main central longitudinal axis extending along the chassis in the general direction of forward motion of the chassis, the inlet to the bale forming chamber being located towards the front of the bale forming chamber relative to the direction of forward motion of the chassis, and the lower arcuate segment is located rearwardly of the inlet for discharging the bale from the bale forming chamber in a generally rearwardly direction.

23. A baler as claimed in claim 22 in which the main central axis defined by the bale forming chamber extends transversely of the main central longitudinal axis defined by the chassis.

24. A baler as claimed in claim 14 in which the bale forming means comprises a plurality of bale forming rollers rotatably carried on the arcuate segments which form the circumferential periphery of the bale forming chamber, the bale forming rollers being arranged around the main central axis to define the circumferential periphery of the bale forming chamber for forming the material into a bale, the bale forming rollers defining respective geometrical secondary axes which extend parallel to the main central axis defined by the bale forming chamber.

* * * * *